United States Patent [19]

Iino et al.

[11] Patent Number: 4,901,529
[45] Date of Patent: Feb. 20, 1990

[54] HYDRAULICALLY OPERATED CONTINUOUSLY VARIABLE TRANSMISSION

[75] Inventors: Takashi Iino; Koji Yamaguchi; Eiichiro Kawahara; Kazuya Maki, all of Saitama, Japan

[73] Assignee: Honda Giken Kogyo Kabushiki Kaisha, Tokyo, Japan

[21] Appl. No.: 76,789

[22] Filed: Jul. 23, 1987

[30] Foreign Application Priority Data

Jul. 23, 1986 [JP] Japan ................... 61-173377
Jul. 23, 1986 [JP] Japan ................... 61-173378
Jul. 23, 1986 [JP] Japan ................... 61-173379

[51] Int. Cl.⁴ ............................................. F16D 39/00
[52] U.S. Cl. ........................................ 60/489; 60/487
[58] Field of Search ........................ 60/487–492; 91/488, 499, 505, 506

[56] References Cited

U.S. PATENT DOCUMENTS

| 3,175,363 | 3/1965 | Molly . | |
|---|---|---|---|
| 3,364,679 | 1/1968 | Osojnak . | |
| 4,444,093 | 4/1984 | Koga et al. | 91/507 X |
| 4,478,134 | 10/1984 | Kawahara et al. | 91/488 |
| 4,646,520 | 3/1987 | Furumoto . | |
| 4,745,748 | 5/1988 | Hayashi . | |

FOREIGN PATENT DOCUMENTS

| 32-7159 | 9/1957 | Japan . | |
|---|---|---|---|
| 54-134252 | 10/1979 | Japan . | |
| 54-134253 | 10/1979 | Japan . | |
| 1294 | 1/1980 | Japan . | 60/487 |
| 55-14312 | 1/1980 | Japan . | |
| 55-152622 | 11/1980 | Japan . | |
| 56-95722 | 8/1981 | Japan . | |
| 56-50142 | 11/1981 | Japan . | |
| 57-70968 | 5/1982 | Japan . | |
| 57-76357 | 5/1982 | Japan . | |
| 57-163704 | 10/1982 | Japan . | |
| 59-44535 | 10/1984 | Japan . | |

Primary Examiner—Edward K. Look
Attorney, Agent, or Firm—Lyon & Lyon

[57] ABSTRACT

A hydraulically operated continuously variable transmission includes a hydraulic pump coupled to an input shaft, a variable-displacement hydraulic motor coupled to an output shaft, and a closed hydraulic circuit interconnecting the hydraulic pump and the hydraulic motor and including a passage connecting the inlet and outlet ports of the hydraulic pump. A servomotor makes and breaks the hydraulic circuit respectively by opening and closing the outlet port. A clutch valve continuously varies the cross-sectional area of the passage to change the amount of power transmitted between the hydraulic pump and the hydraulic motor. A control system independently controls the servomotor and the clutch valve, the control system being arranged to hold the servomotor in a position to open the outlet port when the clutch valve is opened beyond a prescribed degree. The hydraulic motor has motor plungers axially movable through a stroke which is variable by a tiltable motor swash plate which can be tilted by another servomotor. The servomotors include pilot valves which are operatively coupled to each other by a cam mechanism. The hydraulic circuit is kept broken when a motor vehicle incorporating the transmission runs at a prescribed speed or a higher speed and the angle of inclination of the motor swash plate is substantially minimal.

23 Claims, 9 Drawing Sheets

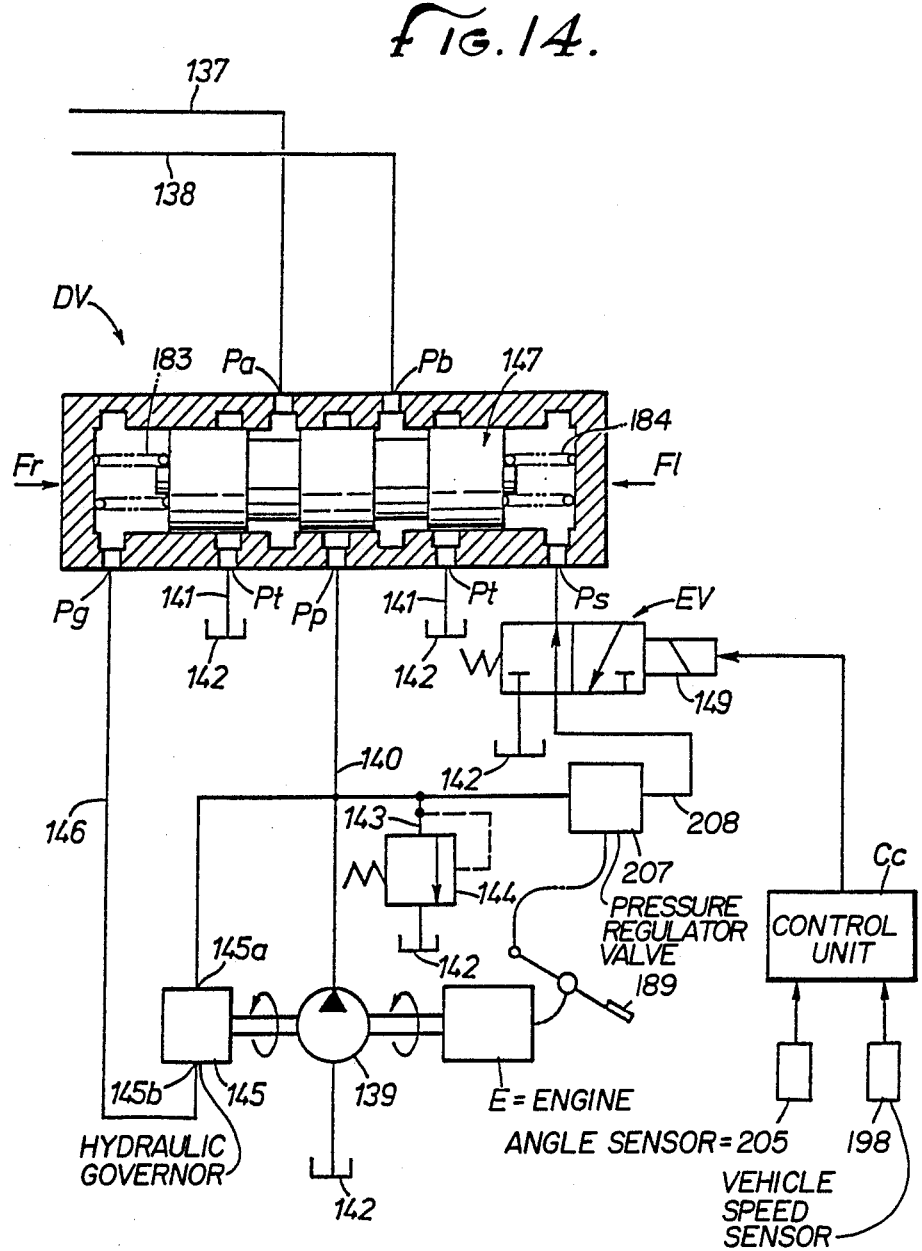

HYDRAULICALLY OPERATED CONTINUOUSLY VARIABLE TRANSMISSION

BACKGROUND OF THE INVENTION

The present invention relates to a hydraulically operated continuously variable transmission, and more particularly to a hydraulically operated continuously variable transmission including a hydraulic pump coupled to an input shaft and a hydraulic motor coupled to an output shaft, the hydraulic pump and the hydraulic motor being interconnected by a hydraulic circuit.

There is known a hydraulically operated continuously variable transmission for use in an automobile, including an input shaft, a hydraulic pump having a pump cylinder coupled to the input shaft and a plurality of pump plungers disposed in the pump cylinder in an annular pattern around an axis of rotation of the pump cylinder, the hydraulic pump having an outlet port, an output shaft, a hydraulic motor having a motor cylinder coupled to the output shaft and a plurality of motor plungers disposed in said motor cylinder in an annular pattern around an axis of rotation of the motor cylinder, the hydraulic motor having an inlet port, a closed hydraulic circuit interconnecting the hydraulic pump and the hydraulic motor, a pump swash plate for reciprocally moving the pump plungers, a tiltable motor swash plate for rotating the motor cylinder in response to reciprocating movement of the pump plungers, the tiltable motor swash plate being tiltable through a continuously variable angle for continuously adjusting the stroke of reciprocating movement of the motor plungers.

As disclosed in Japanese Patent Publications Nos. 32-7159 and 56-50142, for example, such a continuously variable transmission is controlled such that the transmission ratio will be 1:1 while minimizing or eliminating the angle of inclination of the motor swash plate.

By breaking the hydraulic circuit which interconnects the outlet port of the hydraulic pump and the inlet port of the hydraulic motor, the pump plungers can be locked in the pump cylinder to drive the motor cylinder mechanically through the pump swash plate. With the hydraulic motor and pump thus mechanically locked, the oil pressure discharged by the hydraulic pump is prevented from acting on the motor plungers to reduce the thrust load on the motor swash plate and also to reduce oil leakage from between the motor plungers and the motor cylinder.

Where a shoe is mounted on the distal ends of the motor plungers and a hydraulic pressure introduced to the sliding surface of the shoe for balancing the hydraulic pressures, the hydraulic pressure on the sliding surface of the shoe can be lowered and any oil leakage can be reduced by breaking the hydraulic circuit.

It is known that it is possible to improve the power transmission efficiency of the transmission and increase the durability of the transmission by breaking the hydraulic circuit between the hydraulic pump and the hydraulic motor.

It is known that a hydraulically operated continuously variable transmission may have a passage capable of communication between the outlet and inlet ports of the hydraulic pump and also to have a clutch valve for varying the cross-sectional area of the passage to change the amount of power transmitted between the hydraulic pump and the hydraulic motor thereby to control power transmission between the input and output shafts.

Japanese Laid-Open Patent Publication No. 54-134252 discloses a common valve for closing and opening the outlet port of the hydraulic pump and for regulating the amount of oil flow through the passage between the outlet and inlet ports of the hydraulic pump. In such a disclosed arrangement, since the outlet port of the hydraulic pump is selectively closed and opened and the clutch valve is continuously operated or under analog control, delicate clutch control could not be achieved if the outlet port of the hydraulic pump and the clutch valve were controlled by a single actuator.

The making and breaking of the hydraulic circuit and the clutch valve are separately controlled by independent actuators in a transmission disclosed in Japanese Laid-Open Patent Publication No. 55-152622. However, if the outlet port of the hydraulic pump were opened at the time the clutch valve is controlled to make the clutch OFF in order to bring the transmission into a neutral condition, the hydraulic pump and the hydraulic motor would be mechanically coupled by the pump plungers and the pump swash plate, and the power would not be cut off even if the clutch is OFF.

Japanese Patent Publication No. 56-50142 discloses an arrangement for making and breaking the hydraulic circuit by providing a piston rod which can break the hydraulic circuit and applying a hydraulic pressure to the piston rod to break the hydraulic circuit.

The hydraulic circuit is made under the resiliency of a return spring, which should be capable of producing a relatively large spring force in order to make the hydraulic circuit reliably. An actuator employed for moving the piston rod to breaking the hydraulic circuit against the force of the return spring should therefore by capable of applying a large force and needs to be large in size. The disclosed arrangement is not preferable for this reason.

One solution is to use a hydraulic servomotor for operating a device to make and break the hydraulic circuit with a relatively small force, as disclosed in Japanese Laid-Open Patent Publication No. 54-134253. A valve for making and breaking the hydraulic circuit is operated by a pilot valve which is also governed by a spring force. In order to ensure reliable operation, therefore, a large spring force must be established, and the resulting system is large in size.

As disclosed in Japanese Laid-Open Patent Publications Nos. 54-134252 and 55-14312, for example, it is known that in order to achieve smooth and economical operation of a motor vehicle, it is effective to control the transmission so that the amount of opening of the throttle valve and the engine rotational sped will be proportional to each other.

When the hydraulic circuit is broken at the time the transmission ratio is minimal, since the volumetric efficiency becomes higher than before the circuit is broken, the engine rotational speed is lower as indicated by the following equations:

$$\text{Volumetric efficiency} = \frac{\text{Output shaft speed}}{\text{Input shaft speed}} \times \text{Transmission ratio} \times 100\ (\%)$$

i.e., $$\text{Input shaft speed} = \frac{\text{Output shaft speed}}{\text{Volumetric efficiency}} \times$$

-continued

Transmission ratio × 100 (%)

Therefore, in a motor vehicle in which the transmission is controlled as a function of the throttle valve opening and the engine speed, the following steps are repeated if the throttle valve opening is kept at a substantially constant level:

(1) The transmission ratio becomes 1 (the angle of the motor swash plate is minimal);
(2) The device for making and breaking the hydraulic circuit is operated to break the circuit;
(3) The engine rotational speed is lowered due to an increase in the volumetric efficiency;
(4) The angle of the motor swash plate is controlled so as to increase the transmission ratio;
(5) The hydraulic circuit is established again; and
(6) The transmission ratio becomes 1 again.

When the above steps are repeated in a short period of time, the device for making and breaking the hydraulic circuit is subjected to hunting, and smooth running of the vehicle may not be achieved.

The same problem is likely to happen when the transmission is controlled on the basis of the engine torque in order to obtain minimum fuel consumption. More specifically, when the engine rotational sped is reduced, the engine torque is increased, and the angle of the motor swash angle is controlled in the same manner as described above. The device for making and breaking the hydraulic circuit now suffers from hunting.

SUMMARY OF THE INVENTION

In view of the aforesaid drawbacks of the conventional hydraulically operated continuously variable transmissions, it is an object of the present invention to provide a hydraulically operated continuously variable transmission which can reliably cut off power transmission between input and output shafts when the clutch is OFF and which is capable of delicate clutch control.

Another object of the present invention is to provide a hydraulically operated continuously variable transmission including means for reliably making and breaking a hydraulic circuit even with a relatively small force and which is relatively small in size and simple in structure.

Still another object of the present invention is to provide a hydraulically operated continuously variable transmission having means capable of preventing a motor swash plate from hunting.

According to the present invention, there is provided a hydraulically operated continuously variable transmission comprising an input shaft, a hydraulic pump coupled to the input shaft and having inlet and outlet ports, an output shaft, a variable-displacement hydraulic motor coupled to the output shaft, a closed hydraulic circuit interconnecting the hydraulic pump and the hydraulic motor and including a passage connecting the inlet and outlet ports of the hydraulic pump, a servomotor for making and breaking the hydraulic circuit respectively by opening and closing the outlet port, a clutch valve for continuously varying the cross-sectional area of the passage to change the amount of power transmitted between the hydraulic pump and the hydraulic motor, and a control system for independently controlling the servomotor and the clutch valve, the control system being arranged to hold the servomotor in a position to open the outlet port when the clutch valve is opened beyond a prescribed degree.

According to the present invention, there is also provided a hydraulically operated continuously variable transmission comprising an input shaft, a hydraulic pump having a pump cylinder coupled to the input shaft and a plurality of pump plungers disposed in the pump cylinder in an annular pattern around an axis of rotation of the pump cylinder, the hydraulic pump having an outlet port, an output shaft, a hydraulic motor having a motor cylinder coupled to the output shaft and a plurality of motor plungers disposed in said motor cylinder in an annular pattern around an axis of rotation of the motor cylinder, the hydraulic motor having an inlet port, a closed hydraulic circuit interconnecting the hydraulic pump and the hydraulic motor, a pump swash plate for reciprocally moving the pump plungers, a tiltable motor swash plate for rotating the motor cylinder in response to reciprocating movement of the pump plungers, the tiltable motor swash plate being tiltable through a continuously variable angle for continuously adjusting the stroke of reciprocating movement of the motor plunders, a first hydraulic sevomotor operable by a first pilot valve for varying the angle of inclination of the motor swash plate, a second hydraulic servomotor operable by a second pilot valve for selectively connecting and disconnecting the outlet and inlet ports, and a cam mechanism operatively coupling the first and second pilot valves.

According to the present invention, there is further provided a hydraulically operated continuously variable transmission comprising an input shaft, a hydraulic pump having a pump cylinder coupled to the input shaft and a plurality of pump plungers disposed in the pump cylinder in an annular pattern around an axis of rotation of the pump cylinder, the hydraulic pump having an outlet port, an output shaft, a hydraulic motor having a motor cylinder coupled to the output shaft and a plurality of motor plungers disposed in said motor cylinder in an annular pattern around an axis of rotation of the motor cylinder, the hydraulic motor having an inlet port, a closed hydraulic circuit interconnecting the hydraulic pump and the hydraulic motor, a pump swash plate for reciprocally moving the pump plungers, a tiltable motor swash plate for rotating the motor cylinder in response to reciprocating movement of the pump plungers, the tiltable motor swash plate being tiltable through a continuously variable angle for continuously adjusting the stroke of reciprocating movement of the motor plungers, detector means for detecting an operating condition of an engine which drives the input shaft, means for disconnecting the outlet and input ports when the angle of the motor swash plate is substantially minimal, and control means responsive to a signal from the detector means for tilting the motor swash plate to operate the engine in a prescribed condition, the control means being arranged such that when a vehicle incorporating the hydraulically operated continuously variable transmission runs at a prescribed speed or a higher speed and the angle of the motor swash plate is substantially minimal.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 14 is a hydraulic circuit diagram of a hydraulic control arrangement according to a still further embodiment of the present invention.

DESCRIPTION OF THE PREFERRED EMBODIMENTS

Figure 1:
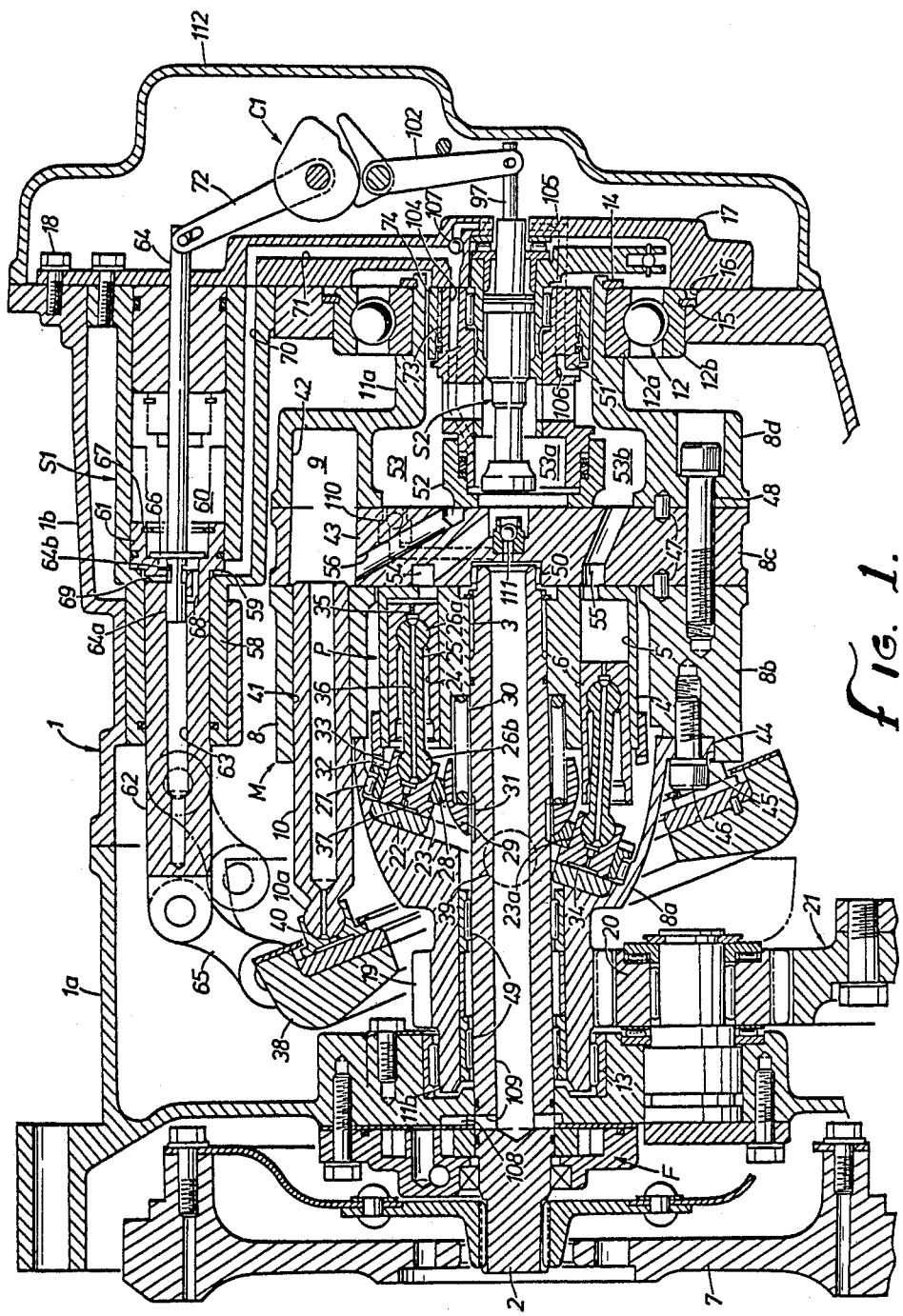
FIG. 1 is a longitudinal cross-sectional view of a hydraulically operated continuously variable transmission according to the present invention.

Like or corresponding parts are denoted by like or corresponding reference numerals throughout several views.

FIG. 1 shows a hydraulically operated continuously variable transmission according to the present invention, the transmission basically comprising a hydraulic pump P and a hydraulic motor M housed in a transmission case 1 composed of a pair of longitudinally separated case numbers 1a, 1b.

The hydraulic pump P has a pump cylinder 4 splined to an end 3 of an input shaft 2, a plurality of cylinder holes or bore 5 defined in the pump cylinder 4 in a circular pattern around and concentric with the input shaft 2 and extending parallel to the input shaft 2, and a plurality of pump plungers 6 slidably fitted respectively in the cylinder holes 5. The hydraulic pump P can be driven by the power of an engine (not shown) which is transmitted through a flywheel 7 coupled to the opposite end of the input shaft 2.

The hydraulic motor M has a motor cylinder 8 disposed in surrounding relation to the pump cylinder 4, a plurality of cylinder holes or bores 9 defined in the motor cylinder 8 in a circular pattern around and concentric with the input shaft 2 and extending parallel to the input shaft 2, and a plurality of motor plungers 10 slidably fitted respectively in the cylinder holes 9. The hydraulic motor M is rotatable relatively to the pump cylinder 4 in concentric relation thereto.

The motor cylinder 8 has axially opposite ends on which a pair of support shafts 11a, 11b is disposed, respectively. The support shaft 11a is rotatably supported on the axial end wall of the case member 1b by means of a ball bearing 12, and the support shaft 11b is rotatably supported on the axial end wall of the case member 1a by means of a needle bearing 13.

The ball bearing 12 has an inner race 12a and an outer race 12b. The support shaft 11a has an outer end projecting beyond the inner race 12a and on which a stop ring 14 is mounted. Another stop ring 15 is mounted on an outer peripheral surface of the outer race 12b near an outer end thereof, and is received in an annular recess 16 defined in an outer surface of the axial end wall of the case member 1b. A holder plate 17 held against an outer end surface of the outer race 12b is fixed by bolts 18 to the axial end wall of the case member 1b. The ball bearing 12 and the support shaft 11a are thus fixedly mounted on the case member 1b against axial movement.

The other support shaft 11b has an integral gear 19 meshing with an idler gear 20 for transmitting output power of the hydraulic motor M therethrough to a differential gear mechanism 21.

A pump swash plate 22 inclined at an angle to the pump plungers 6 is fixedly disposed radially inwardly of the motor cylinder 8. An annular pump shoe 23 is rotatably slidably supported on an inclined surface of the pump swash plate 22.

Each of the pump plungers 6 has a bottomed hole 21 opening toward the pump swash plate 22. A connecting rod 25 is inserted in each pump plunger 6 and pivotally movable with respect to the pump plunger 6 by means of a ball joint 26a on the inner end of the connecting rod 25. The connecting rod 25 projects out of the corresponding pump plunger 6 from the bottomed hole 24, and is pivotally movable with respect to the pump shoe 23 by means of a ball joint 26b on the outer projecting end of the connecting rod 25.

The annular pump shoe 23 has its outer peripheral surface supported in the motor cylinder 8 by a needle bearing 27. The annular pump shoe 23 has an annular step 23a defined in its inner peripheral surface facing the pump plungers 6. A presser ring 28 riding in the annular step 23a presses the pump shoe 23 toward the pump swash plate 22 under the resiliency of a compression coil spring 30 disposed under compression around the input shaft 2 and acting on a spring holder 29 held against the presser ring 28. The spring holder 29 is slidably fitted over splines 31 on the input shaft 2, and has a partly spherical surface contacting a complementary partly spherical surface of the presser ring 28. Therefore, the spring holder 29 is neatly held against the presser ring 28 for transmitting the resilient force from the spring 30 to the presser ring 28 irrespective of how the spring holder 29 and the presser ring 28 are relatively positioned.

Thus, the pump shoe 23 can be slidingly rotated in a fixed position on the pump swash plate 22 at all times.

Bevel gears 32, 33, which have the same number of teeth, are fixed respectively to the confronting surfaces of the pump shoe 23 and the pump cylinder 4 and are held in mesh with each other. When the pump cylinder 4 is driven to rotate by the input shaft 2, the pump shoe 23 is rotated in synchronism with the pump cylinder 4 through the meshing bevel gears 32, 33. On rotation of the pump shoe 23, those pump plungers 6 which run along an ascending side of the inclined surface of the pump swash plate 22 are moved in a discharge stroke by the pump swash plate 22, the pump shoe 23, and the connecting rods 25, and those pump plungers 6 which travel along a descending side of the inclined surface of the pump swash plate 22 are moved in a suction stroke.

During the above operation, paths followed by the centers of the ball joints 26a, 26b on the opposite ends of the connecting rods 25 do not lie in the same cylindrical plane because of the inclination of the pump swash plate 22, i.e. pump shoe 23. Since, however, the connecting rods 25 are pivotally moved about the ball joints 26a in the bottomed holes 24 of the pump plungers 6 according to the different paths of rotation of the ball joints 26a, 26b, the pump plungers 6 can smoothly be slid in the respective cylinder holes 5. Substantially one half of the pump plungers 6 are always in the discharge stroke, and hence corresponding one half of the pump shoe 23 is pressed against the pump swash plate 22 by the connecting rods 25 under a high hydraulic pressure developed in oil chambers defined in the pump cylinder 4 behind the pump plungers 6. At the same time, the other half of the pump shoe 23 is also subjected to the same high hydraulic pressure. Accordingly, the entire sliding surface of the pump shoe 23 is pressed against the pump swash plate 22 at all times, and remains closely in contact with the pump swash plate 22 without the danger of being lifted off even when an abrupt pressure drop is developed for some reason in oil chambers behind those pump plungers 6 which operate in the suction stroke.

The pump shoe 23 has hydraulic pockets 34 defined in its surface held against the pump swash plate 22 and positioned in alignment with the respective connecting rods 25. The hydraulic pockets 34 communicate with the respective oil chambers in the pump cylinder 4 through oil holes 35 defined in the pump plungers 6, oil holes 36 defined in the connecting rods 25, and oil holes 37 defined in the pump shoe 23. While the pump cylinder 4 is in operation, therefore, oil under pressure in the pump cylinder 4 is supplied to the hydraulic pockets 34 to apply a hydraulic pressure to the pump shoe 23 in a direction to bear the thrust force imposed by the pump plungers 6 on the pump shoe 23. Therefore, the oil supplied to the hydraulic pockets 34 serves to reduce the pressure under which the pump shoe 23 contacts the pump swash plate 22, and also to lubricate the mutually sliding surfaces of the pump shoe 23 and the pump swash plate 22.

A motor swash plate 38 is tiltably supported in the transmission case 1 by means of a pair of trunnions 39 projecting from opposite sides of the motor swash plate 38, which is held in confronting relation to the motor plungers 10. The motor swash plate 38 has an inclined surface on which there is slidably disposed a motor shoe 40 that is pivotally coupled to ball joints 10a on the outer ends of the motor plungers 10.

Each of the motor plungers 10 reciprocally moves in expansion and compression strokes while rotating the motor cylinder 8. The stroke of the motor plungers 10 can be adjusted from zero to a maximum level by varying the angle of inclination of the motor swash plate 38 from a vertical position (shown by the two-dot-dash lines) in which the motor swash plate 38 lies perpendicularly to the motor plungers 10 to a most inclined position (shown by the solid lines), as described later on.

The motor cylinder 8 comprises axially separate first through fourth members or segments 8a through 8d. The first member 8a includes the support shaft 11b and accommodates the pump swash plate 22. The second member 8b has guide holes 41 in the cylinder holes 9, in which the motor plungers 10 are slidably guided, respectively. The third and fourth members 8c, 8d have oil chambers 42 in the cylinder holes 9, the oil chambers 42 being slightly larger in diameter than the guide holes 41. The third member 8c serves as a distribution member 43 having oil passages leading to the cylinder holes 5, 9, and the fourth member 8d includes the support shaft 11a.

The first member 8a has an integral joint flange 44 on its end facing the second member 8b. The joint flange 44 is fitted relatively tightly in a positioning hole 45 defined in the end face of the second member 8b that confronts the joint flange 44. The joint flange 44 is fastened to the second member 8b by means of a plurality of bolts 46. The second, third, and fourth members 8b, 8c, 8d are relatively positioned by knock pins 47 fitted in positioning holes defined in their confronting end faces, and are firmly coupled together by means of a plurality of bolts 48.

The input shaft 2 has an outer end portion rotatably supported centrally in the support shaft 11b of the motor cylinder 8 by a needle bearing 49, and an inner end portion rotatably supported centrally in the distribution member 43 by a needle bearing 50.

The spring 30 is disposed under compression between the pump cylinder 4 and the spring holder 29 for pressing the pump cylinder 4 against the distribution member 43 to prevent oil from leaking from the sliding surfaces of the pump cylinder 4 and the distribution member 43. The resilient force of the spring 30 is also effective in supporting the spring holder 29, the presser ring 28, the pump shoe 23, and the pump swash plate 22 firmly in the motor cylinder 8, as described above.

The support shaft 11a is of a hollow structure in which a fixed shaft 51 is centrally inserted. A distribution ring 52 is fitted over the inner end of the fixed shaft 51 in a fluid-tight manner through an O-ring therebetween. The distribution ring 52 has an axial end face held eccentrically in sliding contact with the distribution member 43. The fourth member 8d of the motor cylinder 8 has an interior hollow space 53 which is divided by the distribution ring 52 into an inner oil chamber 53a and an outer oil chamber 53b.

The distribution member 43 has an outlet port 54 and an inlet port 55. The outlet port 54 provides fluid communication between the cylinder holes 5 that receive the pump plungers 6 operating in the discharge stroke and the inner oil chamber 53a. The inlet port 55 provides fluid communication between the cylinder holes 5 that receive the pump plungers 6 operating in the suction stroke and the outer oil chamber 53b. The distribution member 43 also has a number of communicating ports 56 defined therein and through which the cylinder holes 9 of the motor cylinder 8 communicate with the interior space 53 in the fourth member 8d.

Therefore, a closed hydraulic circuit is formed between the hydraulic pump P and the hydraulic motor M through the distribution member 43 and the distribution ring 52. When the pump cylinder 4 is driven by the input shaft 2, high-pressure working oil discharged by the pump plungers 6 in the discharge stroke flows from the outlet port 54, the inner oil chamber 53a, and the communication ports 56 communicating with the inner oil chamber 53a into the cylinder holes 9 receiving the motor plungers 10 which are in the expansion stroke, thereby imposing a thrust on these motor plungers 10. Working oil discharged by the motor plungers 10 operating in the compression stroke flows through the communication ports 56 communicating with the outer oil chamber 53b and the inlet port 55 into the cylinder holes 5 receiving the pump plungers 6 in the suction stroke.

Upon such circulation of the working oil, the motor cylinder 8 is driven by the sum of the reactive torque applied by the pump plungers 6 in the discharge stroke to the motor cylinder 8 through the pump swash plate 22 and the reactive torque received by the motor plungers 10 in the expansion stroke from the motor swash plate 38.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}}$$
$$= 1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M from zero to a certain value.

Since the displacement of the hydraulic motor M is determined by the stroke of the motor plungers 10, the transmission ratio can continuously be adjusted from 1 to a certain value by tilting the motor swash plate 38 from the vertical position to a certain inclined position.

A hydraulic ratio-changing servomoter S1, or a first servomotor, for tilting the motor swash plate 38 is disposed in an upper portion of the transmission case 1. The ratio-changing servomotor S1 comprises a servo cylinder 58 fixed to the transmission case 1, a servo piston 61 movably disposed in the servo cylinder 58 and dividing the interior space of the servo cylinder 58 into a lefthand oil chamber 59 and a righthand oil chamber 60, a piston rod 62 integral with the servo piston 61, and a rod-shaped first pilot valve 64 slidably fitted in a valve hole 63 defined in the piston rod 62 and extending from an end face of the servo piston 61.

The piston rod 6 integral with the servo piston 61 extends through the servo cylinder 58 and has an end projecting into the transmission case 1. The projecting end of the piston rod 62 is coupled to the motor swash plate 38 through a connector 65 and pivot pins.

The first pilot valve 64 has on its distal end a land 64a intimately fitted in the valve hole 63 and also has a pair of diametrically opposite recesses 64b defined behind the land 64a and extending over a certain axial dimension. A retaining ring 66 is securely fitted over the first pilot valve 64 behind the recess 64b. The retaining ring 66 is engageable with a retaining ring 67 fixed to the inner peripheral surface of the servo piston 61 to prevent the first pilot valve 64 from being detached from the piston rod 62.

The piston rod 62 and the servo piston 61 have a lower discharge passage 68 therein for communicating the righthand oil chamber 60 through the valve hole 63 with an oil tank (not shown) upon rightward movement of the first pilot valve 64, and an upper communication passage 69 defined therein for communicating the righthand oil chamber 60 with the lefthand oil chamber 59 upon leftward movement of the first pilot valve 64.

The lefthand oil chamber 59 of the servo cylinder 58 communicates with the interior space 53 of the fourth member 8d through an oil passage 70 defined in a peripheral wall of the servo cylinder 58 and an oil passage 71 defined in the holder plate 17. Therefore, the lefthand oil chamber 59 can be supplied with oil under pressure from the hydraulic pump P.

When the first pilot valve 64 is moved to the right from the illustrated position, the land 64a closes the upper communication passage 69 and opens the lower discharge passage 68 at the same time. Therefore, oil under pressure flowing from the hydraulic pump P through the oil passages 71, 70 acts only in the lefthand oil chamber 59, moving the servo piston 61 to the right.

When the first pilot valve 64 is moved to the left, the land 64a opens the communication passage 69 into the righthand oil chamber 60 and closes the discharge passage 68, as shown in FIG. 1. Therefore, the oil under pressure from the hydraulic pump P acts in both the oil chambers 59, 60, whereupon the servo piston 61 is moved to the left due to the difference in pressure-bearing areas of these oil chambers.

When the first pivot valve 64 is stopped on its movement to the right or left, the servo piston 61 is also stopped inasmuch as it is hydraulically floating due to the pressure balancing between the oil chambers 59, 60.

In this manner, the servo piston 61 is operated in amplified movement by following the movement of the first pilot valve 64 under the working oil pressure from the interior space 53. In response to movement of the servo piston 61, the motor swash plate 38 can continuously be angularly shifted or adjusted from the most inclined position indicated by the solid lines in FIG. 1 where the transmission ratio is maximum to the least inclined position indicated by the imaginary (two-dot-and-dash) lines where the transmission ratio is minimum The outer end of the first pilot valve 64 projecting through the holder plate 17 is coupled to a first link arm 72 connected to a cam mechanism C1, the first link arm 72 remotely controlled by a control signal, as described later on.

Figure 2:
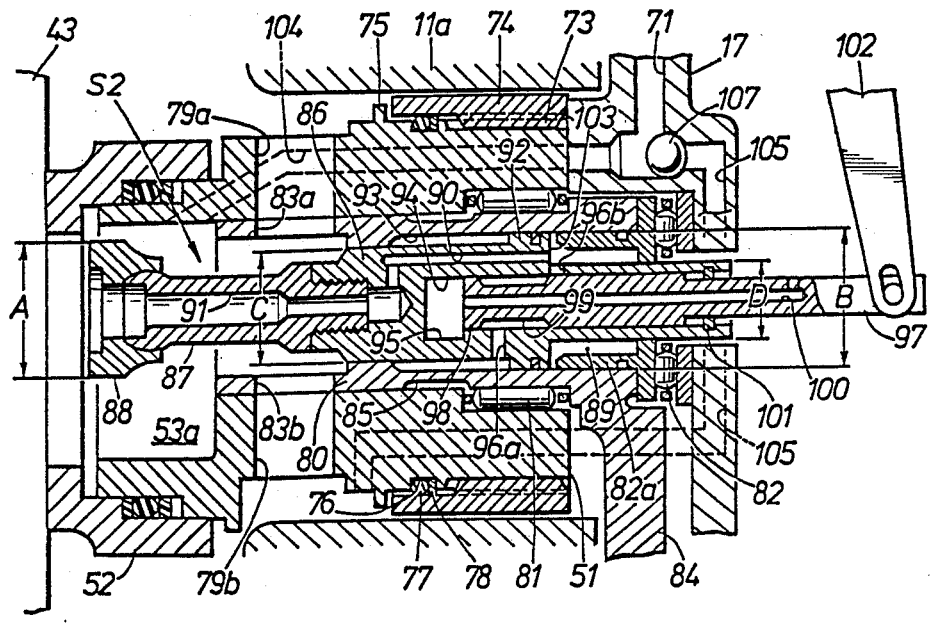
FIG. 2 is an enlarged cross-sectional view of a servomotor for selectively connecting and disconnecting a hydraulic circuit in the hydraulically operated continuously variable transmission shown in FIG. 1.

As better illustrated in FIG. 2, a cylindrical bearing 74 is coupled to the outer peripheral surface of the fixed shaft 51 through splines 73 having relatively large dimensional tolerances in the radial direction. The bearing 74 has its outer peripheral surface slightly spaced from the inner peripheral surface of the support shaft 11a. This spacing between the bearing 74 and the support shaft 11a is uniformized by an film of working oil throughout the entire circumference of the bearing 74 so that the bearing 74 is floatingly supported in the support shaft 11a.

The fixed shaft 51 has an annular ridge 75 projecting radially outwardly and extending circumferentially in a position confronting an axially inner end of the bearing 74. The bearing 74 is limited in its axial movement between the annular ridge 75 and an inner surface of the holder plate 17 fixed to the outer end surface of the transmission case member 1b.

Near the annular ridge 75, there are no splines present between the bearing 74 and the fixed shaft 51, but an annular groove 76 is defined in the outer peripheral surface of the fixed shaft 51. The annular groove 76 receives therein an O-ring 77 and a backup ring 78 both serving as seal members.

The fixed shaft 51 is of a hollow construction having a peripheral wall having radial connecting ports 79a, 79b through which the inner and outer oil chambers 53a, 53b communicate with each other. A cylindrical clutch valve 80 is fitted in the interior space of the fixed shaft 51 for selectively opening and closing the ports 79a, 79b. The clutch valve 80 serves as a clutch for selectively connecting an disconnecting the hydraulic pump P and the hydraulic motor M.

The clutch valve 80 is positioned by a radial needle bearing 81 radially with respect to the fixed shaft 51 and also positioned by a thrust needle bearing 82 axially with respect to the holder plate 17. The clutch valve 80 thus radially and axially positioned is rotatably with respect to the fixed shaft 51. The clutch valve 80 has radial connecting holes 83a, 83b defined in the peripheral wall at its inner end, the holes 83a, 83b being capable of registration with the ports 79a, 79b, respectively. A swing link 84 coupled to a clutch control device (described later) is joined to the outer end of the clutch valve 80. The relative position of the holes 83a, 83b with respect to the ports 79a, 79b can be changed by turning the link 84. When the ports 79a, 79b are fully opened in full registry with the holes 83a, 83b, respectively, the clutch is in an "OFF" position. When the ports 79a, 79b are partly opened by shifting the holes 83a, 83b, the clutch is in a "partly ON" position. When the ports 79a, 79b are fully closed out of full registry with the holes 83a, 83b, respectively, the clutch is in an "ON" position. With the clutch OFF as shown, working oil discharged from the outlet port 54 into the inner oil chamber 53a flows through the ports 79a, 79b and the outer oil chamber 53b directly into the inlet port 5, making the hydraulic motor M inoperative. When the clutch is ON, the above oil flow is shut of, and working oil is circulated from the hydraulic pump P to the hydraulic motor M, allowing hydraulic power to be transmitted from the hydraulic pump P to the hydraulic motor M.

The clutch valve 80 has relief groove 85 defined in its outer peripheral surface near the radial needle bearing 81 to prevent sluggish rotation of the clutch valve 80 even when the fixed shaft 51 is flexed.

A servomotor S2, or a second servomotor, for selectively making and breaking the hydraulic circuit is disposed centrally in the hollow clutch valve 80. The servomotor S2 has a piston shaft 86 slidably fitted in the central hole of the clutch valve 80, and a valve rod 87 threaded in one end of the piston shaft 86. The valve rod 87 has a partly spherical end on which a shoe 88 is pivotally mounted.

When the piston shaft 86 is slid to the left in FIG. 1, the shoe 88 closes a confronting open end of the discharge port 54 of the distribution member 43 in a fluid-tight manner for thereby cutting off the flow of working oil from the discharge port 54 into the inner oil chamber 53a. With the oil flow thus cut off, the pump plungers 6 are hydraulically locked and the hydraulic pump P and the hydraulic motor M are directly connected to each other, so that the motor cylinder 8 can mechanically be driven by the pump cylinder 4 through the pump plungers 6 and the pump swash plate 22. The hydraulic pump P and the hydraulic motor M are directly interconnected in this manner when the motor swash plate 38 is vertically positioned for the minimum transmission ratio. In this transmission position, the efficiency of transmission of power from the input shaft to the output shaft is increased, and the thrust applied by the motor plungers 10 to the motor swash plate 38 is reduced, thus lessening the stresses on the bearings and other members.

The piston shaft 86 has an outer end portion of smaller diameter defining an oil chamber 89 between itself and an inner member 82a of the thrust needle bearing 82 which supports the clutch valve 80. The oil chamber 89 is normally held in communication with the inner oil chamber 53a through an oil passage 90 defined axially in the piston shaft 86 and an oil passage 91 defined axially centrally in the valve rod 87 in communication with the oil passage 90. When the engine is driven, a portion of the high-pressure working oil circulating between the hydraulic pump P and the hydraulic motor M is normally supplied to the oil chamber 89 through the oil passages 91, 90.

The piston shaft 86 has an integral piston 92 on its axially intermediate portion. An annular chamber 93 is defined axially leftwardly of the piston 92 and radially between the inner peripheral surface of the central hole of the clutch valve 80 and the outer peripheral surface of the piston shaft 86. The piston shaft 86 also has a central blind hole 94 extending from the outer end toward an axial position beyond the piston 92, the central blind hole 94 including a relief groove 95, defined in an inner peripheral surface of the piston shaft 86 at the inner end of the blind hole 94. The blind hole 94 and the annular chamber 93 communicate with each other through a radial hole 96a defined in the piston shaft 86 near the inner end of the piston 92. The outer end portion of the piston rod 86 has a hole 96b defined near the outer end of the piston 92 and providing communication between the oil chamber 89 and the blind hole 94.

A rod-shaped second pilot valve 97 is inserted in the blind hole 94 and extends through the holder plate 17 secured to the end wall of the transmission case 1. The second pilot valve 97 has a land 98 on its inner distal end which is slidably held closely against the inner peripheral surface of the blind hole 94, and a smaller-diameter portion 99 positioned rightwardly of the land 98 and having a suitable axial dimension. The second pilot valve 97 also has a central axial hole 100 through which the blind hole 94 is vented to atmosphere. The second pilot valve 97 includes an outer end portion of smaller diameter which extends outwardly from an axially intermediate portion thereof. Outward sliding movement of the second pilot valve 97 is limited when the step at the inner end of the outer end portion of the second pilot valve 97 is engaged by a retaining ring 101 secured to the inner peripheral surface of the piston shaft 86 at its outer end. The second pilot valve 97 can be slidably moved horizontally in FIGS. 1 and 2 by the cam mechanism C1 which is operatively coupled to the outermost end of the second pilot valve 97 through a second link arm 102.

It is assumed here that the end face of the shoe 83 has a pressure bearing area A, the piston 92 has a cross-sectional area B, the inner end of the piston shaft 86 has a pressure bearing area C, and the smaller-diameter outer end portion of the piston shaft 86 has a cross-sectional area D. These areas A, B, C, D are determined such that they meet the following inequalities:

$$A > B - D$$

$$B - D > C$$

When the second pilot valve 97 is moved to the left in FIGS. 1 and 2, the smaller-diameter portion 99 of the second pilot valve 97 is entirely inserted into the blind hole 94 which is located inwardly of the righthand end face 103 of the piston 92. The high-pressure working oil from the discharge port 54 flows through the oil passages 91, 90 into the oil chamber 89 in which the hydraulic pressure acts on the righthand end face 103 of the piston 92. The hydraulic pressure of the working oil in the inner oil chamber 53a also acts on the lefthand end of the piston shaft 86. The piston shaft 86 is now moved to the left because of the inequality: $B-D>C$ since the pressure bearing area of the righthand end face of the piston 92 is expressed by $B-D$ and the pressure bearing area of the inner end face of the piston shaft 86 is expressed by C. The piston shaft 86 is moved leftwardly until the shoe 88 engages the distribution member 43 to close the open end of the discharge port 54, whereupon the hydraulic pump P and the hydraulic motor M are directly interconnected.

Now, the high hydraulic pressure from the outlet port 54 (which is equal to the hydraulic pressure in the oil chamber 89) is exerted on the end face of the shoe 88 which has the pressure bearing area A, and the high hydraulic pressure in the oil chamber 89 acts on the righthand end face 103 of the piston 92 which has the pressure bearing area $B-D$. Inasmuch as $A>B-D$, the shoe 88 is subjected to a force tending to move the same to the right. The shoe 88 is therefore moved slightly to the right. The instant the shoe 88 is unseated off the distribution member 43, the hydraulic pressure on the end face of the shoe 88 is released, whereupon the shoe 88 is forced back against the distribution member 43, closing the open end of the outlet port 54 again. By selecting the areas A, B, C, D to meet the above inequalities, therefore, the shoe 88 can be maintained in a hydraulically floating condition in which the shoe 88 and the outlet port 54 are well kept fluid-tight, reducing any oil leakage from between the shoe 88 and the outlet port 54 to a minimum.

When the second pilot valve 97 is moved to the right, the smaller-diameter portion 99 of the second pilot valve 97 is displaced to the right beyond the righthand end face 103 of the piston 92, and the space around the smaller-diameter portion 99 communicates with the hole 96b in the smaller-diameter end portion of the piston shaft 86. The high-pressure working oil therefore acts on the righthand end face 103 of the piston 92 and the inner end face of the piston shaft 86, and also acts on the lefthand end face of the piston 92 through the hole 96b, the space around the smaller-diameter portion 99, the hole 96a, and the annular chamber 93. At this time, the pressure-bearing area for moving the piston shaft 86 to the left is indicated by $B-D$, whereas the pressure-bearing area for moving the piston shaft 86 to the right is indicated by B. Since $B>B-D$, the piston shaft 86 is moved rightwardly, unlocking the hydraulic motor M and hydraulic pump P from each other.

The ratio-changing servomotor S1 is supplied with working oil from either the inner oil chamber 53a through a passage communicating with the inner oil chamber 53a via a first oil passage 104 defined in the fixed shaft 51 or the outer oil chamber 53b through a passage communicating with the outer oil chamber 53b via a second oil passage 105 defined in the holder plate 17 and a third oil passage 106 defined in the fixed shaft 51. Switching between these passages is effected by a ball shuttle valve 107 positioned in a joint space defined in the holder plate 17 between the first and second oil passages 104, 105.

Upon acceleration and when the outlet port 54 of the hydraulic pump P is not closed, the hydraulic pressure in the inner oil chamber 53a is higher than the hydraulic pressure in the outer oil chamber 53b. Therefore, the shuttle valve 107 is shifted to the right to close the open end of the second oil passage 105, communicating only the first oil passage 104 with the oil passage 71 to supply the working oil from the inner oil chamber 53l to the ratio-changing servomotor S1.

Upon deceleration, or upon acceleration and when the outlet port 54 is closed, the hydraulic pressure in the outer oil chamber 53b is higher than the hydraulic pressure in the inner oil chamber 53a. Thus, the shuttle valve 107 is shifted to the left to close the open end of the first oil passage 104, allowing only the second and third oil passages 105, 106 to communicate with the oil passage 71. As a result, the working oil from the outer oil chamber 53b is supplied to the ratio-changing servomotor S1.

In this manner, the ratio-changing servomotor S1 is supplied with sufficient hydraulic power at all times from the higher-pressure side in the closed hydraulic circuit.

As shown in FIG. 1, a replenishing pump F is mounted on an outer surface of the lefthand case member 1a. The replenishing pump F is driven by the input shaft 2 for feeding working oil from an oil tank (not shown) under a constant pressure. The replenishing pump F has an outlet port 108 communicating through an axial central oil passage 109 defined in the input shaft 2 with the outlet port 54 in the distribution member 43 via a check valve 111 and also with the outer oil chamber 53b via a check valve 110. The replenishing pump F therefore supplies oil to automatically compensate for any oil leakage from the closed hydraulic circuit composed of the hydraulic pump P and the hydraulic motor M.

The cam mechanism C1, the holder plate 17, and other members are covered with an end cover 112 attached to the righthand side end of the transmission case 1.

A control system for controlling the transmission will be described mainly with reference to FIG. 3.

The first link arm 72 coupled at one end to the first pilot valve 64 of the ratio-changing servomotor S1 for tilting the motor swash plate 38 has its opposite end fixed to a driver shaft 120. The driver shaft 120 is supported for rotation about its axis at opposite ends thereof by means of bearings 121, 122 fixed to the holder plate 17. A driver cam 123 and a driver link arm 124 are also fixed to the driver shaft 120 on opposite sides of the first link arm 72.

The second link arm 102 with one end coupled to the second pilot valve 97 of the servomotor S2 for making and breaking the hydraulic circuit has its opposite end fixed to a driven shaft 125 disposed below and extending parallel to the driver shaft 120. The driven shaft 125 has its opposite ends supported for rotation about its own axis the bearing 122 and a bearing 126 secured to the holder plate 17, the driven shaft 125 supporting a driven cam 127 engaging the driver cam 123.

The driven cam 127 is loosely fitted over the driven shaft 125 so as to be rotatable thereon, but is axially immovable on the driven shaft 125. The driven shaft 125 has axial grooves 150 of a certain length defined therein adjacent to the driven cam 127. An arm 151 which is loosely fitted over the driven shaft 125 is rotatable with the driven shaft 125 through engagement in the axial grooves 150 and is axially movable on the driven shaft 125.

The driven cam 127 and the arm 151 have complementarily shaped engaging members 127d, 151a, respectively, on confronting end faces thereof. When the engaging members 127d, 151a engage each other, the driven cam 127, the arm 151, and the driven shaft 125 can rotate with each other. The arm 151 is normally urged in a direction to bring the engaging members 127d, 151a into mutual engagement by a compression coil spring 152 disposed around the driven shaft 125.

The second link arm 102 is normally urged to turn counterclockwise in a direction to pull the second pilot valve 97 out of the servomotor S2 by a torsion spring 153 disposed around the driven shaft 125. Angular movement of the second link arm 102 about the axis of the driven shaft 125 is limited to a certain angular range by a stopper 128 affixed to the holder plate 17 and engageable with the second link arm 102.

The driver link arm 124 has its distal end coupled to a piston rod 129 of a ratio-changing hydraulic cylinder J1. The hydraulic cylinder J1 comprises a cylinder 130 having closed opposite ends, a piston 133 slidably fitted in the cylinder 130 and dividing the interior of the cylinder 130 into a head chamber 131 and a rod chamber 132, and the piston rod 129 integral with the piston 133 and axially movably extending in a fluid-tight manner through an end wall of the cylinder 130 adjacent to the rod chamber 132. The piston 133 and hence the piston rod 129 can be moved by oil under pressure supplied through a first electrohydraulic servovalve SV1 for thereby turning the driver shaft 120 about its own axis.

Figure 3:
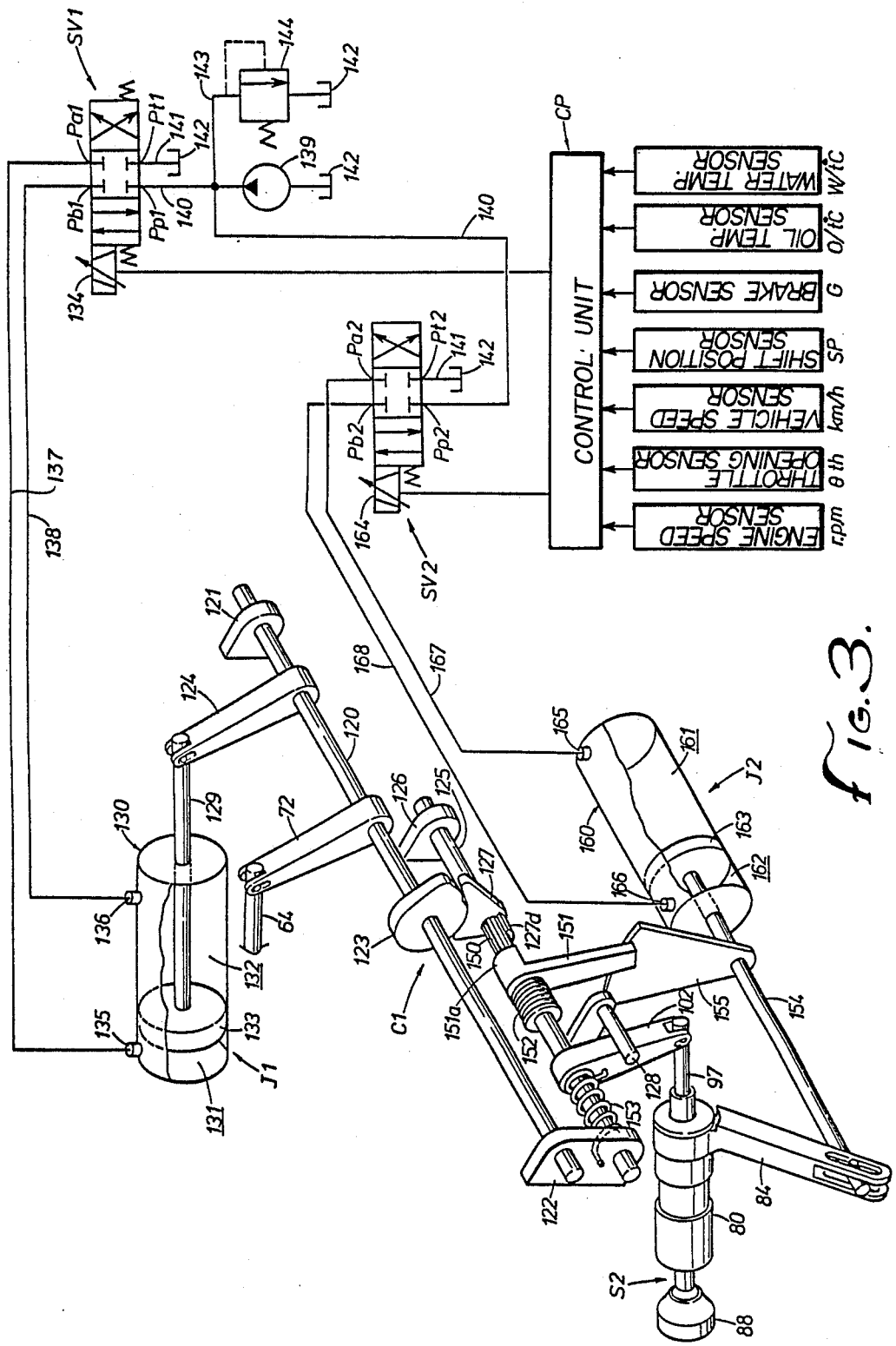
FIG. 3 is a schematic view showing a control system for controlling the hydraulically operated continuously variable transmission.

The swing link 84 projects radially from the outer end of the clutch valve 80 disposed between the servomotor S2 and the fixed shaft 51 (not shown in FIG. 3). The swing link 84 has a distal end coupled to the piston rod 154 of a clutch-controlling hydraulic cylinder J2 for turning the clutch valve 80, the hydraulic cylinder J2 being substantially identical in structure to the hydraulic cylinder J1. The hydraulic cylinder J2 comprises a cylinder 160 and a piston 163 slidably movable therein and defining a head chamber 161 and a rod chamber 162.

A sectorial shifter 155 is transversely mounted on the piston rod 154 of the hydraulic cylinder J2, the shifter 155 engaging the arm 151 on the driven shaft 125. When the piston rod 154 is pushed away from the cylinder 160, the arm 151 is displaced by the shifter 155 to bring the engaging members 127d, 151a out of mutual engagement. When the piston rod 154 is pulled into the cylinder 160, the shifter 155 allows the engaging members 127d, 151a to remain in mutual engagement.

As shown in FIG. 2, the holes 83a, 83b of the clutch valve 80 and the ports 79a, 79b of the fixed shaft 51 are positioned such that when the piston rod 154 is pulled into the cylinder 160, the holes 83a, 83b and the ports 79a, 79b are displaced fully out of registry to cut off mutual fluid communication therebetween, and when the piston rod 154 is pushed away from the cylinder 160, the holes 83a, 83b and the ports 79a, 79b are shifted into registry to allow a fluid flow therebetween. The clutch-controlling hydraulic cylinder J2 is controlled through a second electrohydraulic servovalve SV2.

The servovalves SV1, SV2 are directional control valves as well as continuously variable restrictors, and have a neutral position. The servovalves SV1, SV2 are responsive to current signals applied by a control unit CP to respective solenoids 134, 136 associated with the servovalves SV1, SV2 for controlling the rate of oil flow to be supplied to and discharged from the servovalves SV1, SV2.

The first servovalve SV1 for controlling the ratio-changing hydraulic cylinder 1 has four ports, i.e., a pump port Pp1, a tank port Pt1, and a pair of output ports Pa1, Pb1, the output ports Pa1, Pb1 being connected via respective pipes 137, 138 to input ports 135, 136 of the head and rod chambers 131, 132, respectively, of the hydraulic cylinder J1. The pump port Pp1 is coupled to a gear pump 139 (which may be the replenishing pump F) through a pipe 140. The tank port Pt1 is connected to an oil tank 142 through a pipe 141. Between the gear pump 139 and the pump port Pp1, there is connected a relief pipe 143 coupled to the oil tank 142 for returning oil to the oil tank 142 and having a relief valve 144. Oil under pressure fed from the gear pump 139 may be relieved to the oil tank 142 for keeping the hydraulic pressure in the pipes within a prescribed pressure range.

The second servovalve SV2 for controlling the clutch-controlling hydraulic cylinder J2 has four ports, i.e., a pump port Pp2, a tank port Pt2, and a pair of output ports Pa2, Pb2, the output ports Pa2, Pb2 being connected via respective pipes 167, 168 to input ports 165, 166 of the head and rod chambers 161, 162, respectively, of the hydraulic cylinder J2. The pump port Pp2 is coupled to the discharge pipe 140 of the gear pump 139 parallel to the pump port Pp1 of the first servovalve SV1. The tank port Pt2 is connected to the oil tank 142 through the pipe 141.

The control unit CP for controlling the transmission control system comprises, for example, a D/A converter, an A/D converter, an interface, a CPU, a RAM, and a ROM which are interconnected by an address data bus. Various data items, such as an engine rotational speed (r.p.m.), a throttle opening ($\theta$th), a vehicle speed (Km/h), a shift position (SP), a braking deceleration (G), an oil temperature (O/t°C), and an engine cooling water temperature (W/t°C), are detected by respective sensors. The detected data items are processed according to map control, for example, to produce current signals that are then applied to the solenoids 134, 164 of the servovalves SV1, SV2 for operating the servovalves SV1, SV2 as indicated by Tables 1, 2 (given later).

More specifically, when the solenoid 134 (164) is de-energized, the spool of the servovalve SV1 (SV2) is in a neutral position in which no oil flows across the servovalve SV1 (SV2). Therefore, the piston rod 129 (154) of the hydraulic cylinder J1 (J2) is not displaced, and the various parts remain as they are.

When the solenoid 134 (164) is energized by a positive current, the spool thereof is moved to the leftward position to allow oil from the gear pump 139 to flow under pressure through the pipe 138 (168) and the input port 136 (166) of the cylinder 130 (160) into the rod chamber 132 (162) of the hydraulic cylinder J1 (J2) while discharging oil from the head chamber 131 (161) through the other input port 135 (165) and the pipe 137 (167) into the tank 142. Thus, when the current supplied to the solenoid 134 (164) is positive, the piston 133 (163) of the hydraulic cylinder J1 (J2) is displaced to pull the piston rod 129 (154) into the cylinder 130 (160). At this time, the current applied to the solenoid 134 (164) is suitably regulated to vary the restriction by the servovalve SV1 (SV2) to vary the speed at which the piston 129 (154) is displaced.

When a negative current is passed through the solenoid 134 (164), the spool thereof is moved to the rightward position to cause oil from the gear pump 139 to flow in opposite directions for pushing the piston rod 129 (154) out of the cylinder 130 (160).

TABLE 1

Control of ratio-changing servomotor S1

| Solenoid current | Spool position | Piston rod position (J1) (Pilot valve 64) | Motor swash plate angle | Transmission ratio |
|---|---|---|---|---|
| 0 | Neutral | Stopped | Fixed | Fixed |
| + | Leftward | Leftward | Larger | Larger |
| − | Rightward | Rightward | Smaller | Smaller |

TABLE 2

Clutch control

| Solenoid current | Spool position | Piston rod position (J2) | Clutch opening | Power Transmitted |
|---|---|---|---|---|
| 0 | Neutral | Stopped | Fixed | Fixed |
| + | Leftward | Rightward | Closed | Increased |
| − | Rightward | Leftward | Opened | Reduced |

The cam mechanism C1 comprised the driver cam 123 rotatable with the first link arm 72 coupled to the first pilot valve 64 of the ratio-changing servomotor S1 which actuates the motor swash plate 38, and the driven cam 127 rotatable with the second link arm 102 coupled to the second pilot valve 97 of the servomotor S2 which selectively makes and breaks the hydraulic circuit.

Figure 4:
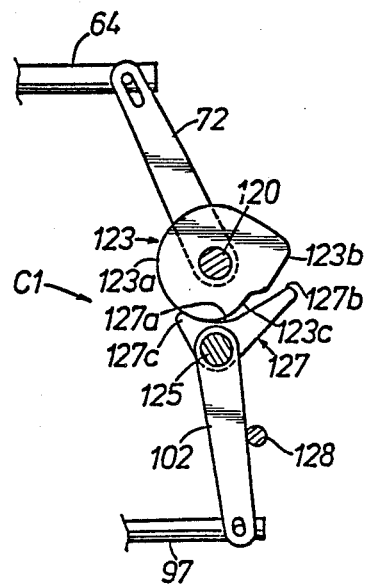

As shown in FIG. 4, the driver cam 123 comprises a semicircular portion 123a having a semicircular arc about the driver shaft 120, a lobe 123b projecting radially outwardly beyond the radius of the semicircular portion 123a, and a recess 123c defined radially inwardly within the radius of the semicircular portion 123a. The driver cam 123 has a profile composed of the semicircular portion 123a, the lobe 123b, and the recess 123c which are smoothly joined.

The driven cam 127 comprises an arcuate portion 127a having a concave surface of substantially the same carvature as that of the semicircular portion 123a and a straight portion 127b extending substantially tangentially to the arcuate portion 127a.

Operation of the hydraulically operated continuously variable transmission will be described below primarily with reference to FIGS. 3 through 6.

First, closing of the outlet port 54 from its open condition will be described. In FIG. 4, the first pilot valve 64 is moved to the left, and hence the motor swash plate 38 is in its most inclined position for the maximum transmission ratio because of the leftward displacement of the piston rod 62 of the ratio-changing servomotor S1.

In this condition, the semicircular portion 123a of the driver cam 123 is in contact with the arcuate portion 127a of the driven cam 127, and the second link arm 102 is engaged by the stopper 128. Therefore, the driven shaft 125 cannot be rotated about its own axis in any direction, and hence the second pilot valve 97 of the servomotor S2 is held in its rightward position, keeping the outlet port 54 open.

Figure 5:
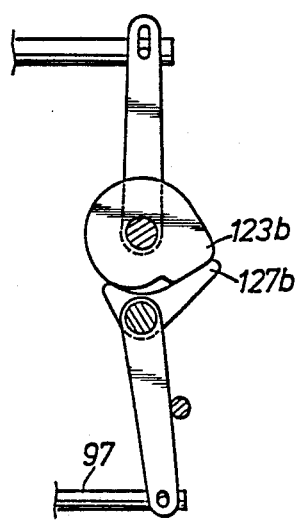
FIGS. 4 through 6 are views showing operation of a cam mechanism in the hydraulically operated continuously variable transmission.

Then, the piston rod 129 of the hydraulic cylinder J1 is moved to the right, the driver shaft 120 and hence the driver cam 123 are rotated clockwise. However, until the lobe 123b of the driver cam 123b engages the straight portion 127b of the driven cam 127b, as shown in FIG. 5, the driven cam 127 is not rotated, and hence the second pilot valve 97 is not moved, still keeping the outlet port 54 open.

Figure 6:
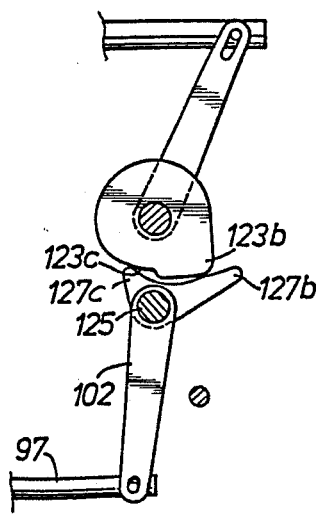

Further movement of the piston rod 129 to the right causes the lobe 123b of the driver cam 123 to depress the straight portion 127b of the driven cam 127, as shown in FIG. 6. If the piston rod 154 of the hydraulic cylinder J2 (FIG. 3) is pulled into the cylinder 160, i.e., if the clutch is ON at this time, then the arm 151 and the shifter 155 are held out of the contact with each other, and therefore the engaging portions 127a, 151a are in engagement with each other under the bias of the spring 152, so that the driven shaft 125 can turn with the driven cam 127. The second link arm 102 is now turned clockwise with the driven shaft 125 to move the second pilot valve 97 to the left. As a consequence, the shoe 33 is moved leftwardly with the piston shaft 86 of the servomotor S2 under hydraulic pressure, as described above, to close the outlet port 54.

At this time, the first pilot valve 64 of the ratio-changing servomotor S1 is at the rightward position, and hence the motor swash plate 38 is in the vertical position for the minimum transmission ration. The outlet port 54 remains closed since the opposite ends of the driven cam 127 is engaged by the lobe 123b and the recess 123c of the driver cam 123 against angular movement in any direction.

When the driver cam 123 is turned counterclockwise, the recess 123c engages an end 127c of the driven cam 127 remote from the straight portion 127b to turn the second link arm 102 in a direction to move the second pilot valve 97 to the right. The driver and driven cams 123, 127 are profiled such that while the parts are moving from the position of FIG. 6 to the position of FIG. 5, the lobe 123b and the straight portion 127b are kept out of contact with each other. Therefore, upon an increase in the transmission ratio, the outlet port 54 can immediately be opened.

When the piston rod 154 is pushed out of the cylinder 160 of the hydraulic cylinder J2 in order to open the clutch valve 80 to make the clutch OFF, the shifter 155 shifts the arm 151 axially to bring the engaging members 127d, 151a out of mutual engagement. The driven cam 127 is now freed, and the driven shaft 125 becomes urged by the torsion spring 153 to turn in the direction to move the pilot valve 97 of the servomotor S2 to the right, without being restricted by the driver cam 123.

Accordingly, no matter how the ratio-changing hydraulic cylinder J1 may be controlled, once the clutch valve 80 is opened to make the clutch OFF, the servomotor S2 is held in the position to open the outlet port 54 of the hydraulic pump P, thus reliably cutting off the power which would otherwise be transmitted.

Furthermore, the outlet port 54 of the hydraulic pump P can be opened and closed through the second pilot valve 97 by the cam mechanism C1 which can reliably operate with a relatively small force applied. Thus, the second pilot valve 97 and hence the servovalve S2 has a high degree of operation reliability.

The torsion spring 153 keeps the lobe 123b and the straight portion 127b in contact with each other, thus eliminating play or backlash and reducing hysteresis. The spring force of the spring 153 may be quite small, so that its effect on the hydraulic cylinder J1 is negligible.

The motor swash plate 38 and the clutch valve 80 may be electrically controlled by step motors or motor-driven linear actutators, rather than the hydraulic cylinders J1, J2.

The control system may employ a mechanical control arrangement using a governor and the like, or a purely hydraulic control arrangement, instead of the electronic control unit CP.

Figure 7:
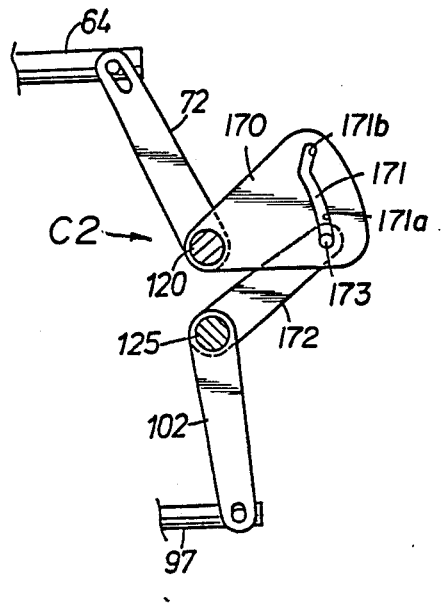
FIGS. 7 through 9 are views showing operation of a cam mechanism according to another embodiment of the present invention.
Figure 8:
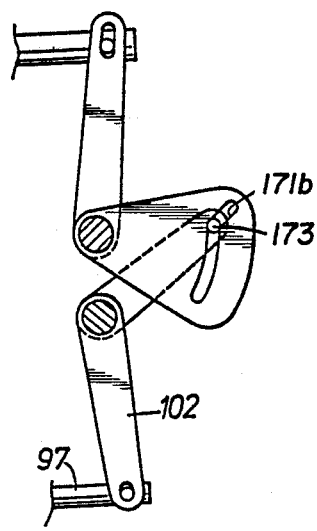
Figure 9:
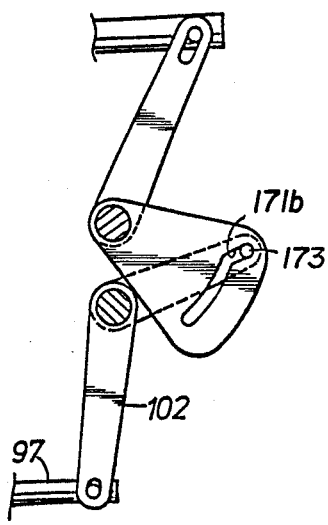

FIGS. 7 through 9 show a cam mechanism C2 according to another embodiment of the present invention. The cam mechanism C2 shown in FIGS. 7 through 9 comprises a driver plate 170 fixed to the driver shaft 120 and having a cam groove 171 and a driven arm 172 fixed to the driven shaft 125 and having a pin 173 movably riding in the cam grove 171 for transmitting motion between the driver and driven shafts 120, 125.

The cam grove 171 includes an arcuate portion 171a extending through a certain angle around the driver shaft 120 and a straight portion 171b extending obliquely radially outwardly from the upper end of the arcuate portion 171a. When the first pilot valve 64 is positioned for the maximum transmission ratio as shown in FIG. 7, the pin 173 is located at the lower end of the cam groove 171. As the first pilot valve 64 is moved to the right from the position of FIG. 7, the cam plate 170 is turned, but the pin 153 is not moved since it is positioned in the arcuate portion 171a of the cam groove 171. Therefore, as long as the pin 173 rides in the arcuate portion 171a, the second pilot valve 97 remains still.

When the pin 173 starts entering the straight portion 171b of the cam groove 171 upon continued movement of the first pilot valve 64 to the right, the driven arm 172 is moved by the driver plate 170 to turn the second link arm 102 clockwise. The second pilot valve 97 is now moved to the left to close the outlet port 54 (FIG. 1).

When the cam mechanism C2 is in the position illustrated in FIG. 7, the pin 173 is confined in the cam groove 171 to prevent the driven shaft 125 from being turned about its own axis in any direction. Therefore, the stopper 128 (FIG. 1) may be dispensed with.

Figure 10:
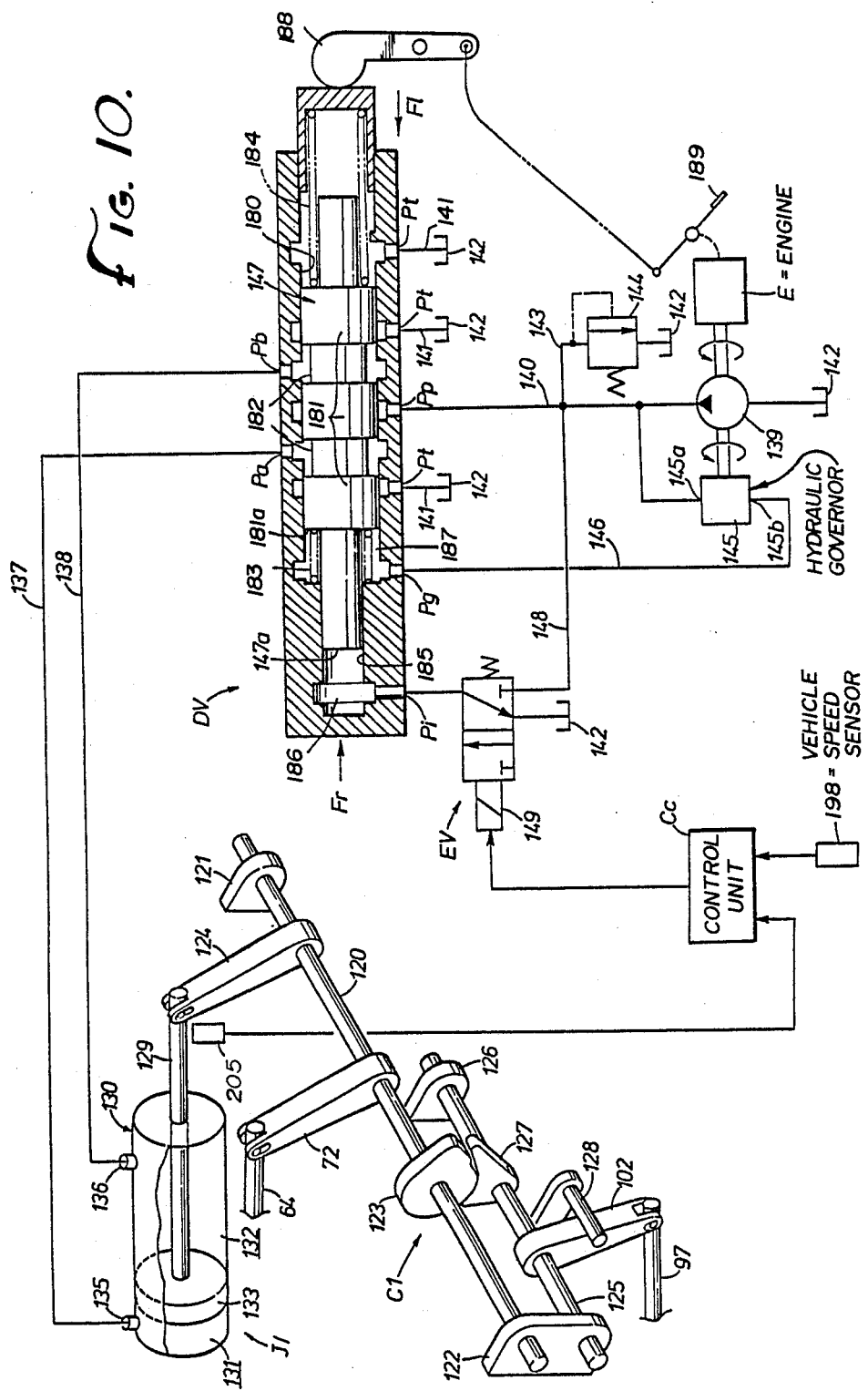
FIG. 10 is a schematic view of a control system according to still another embodiment of the present invention.
Figure 11:
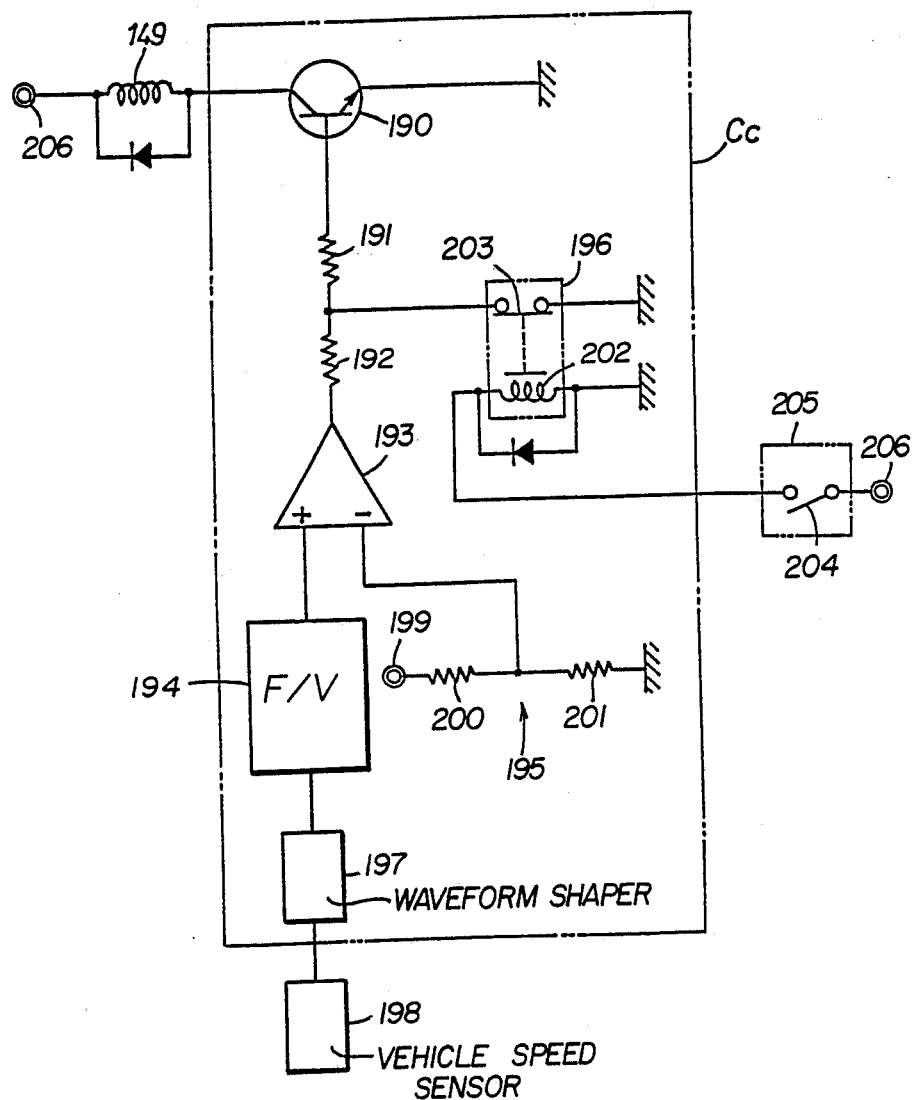
FIG. 11 is a circuit diagram, partly in block form, of a control unit employed in the control system shown in FIG. 10.

FIG. 10 shows a control system according to still another embodiment of the present invention.

The hydraulic cylinder J1 is controlled by a hydraulic control valve DV which doubles as a directional control valve and a continuous restrictor and has a neutral position. The control valve DV controls the rate of oil flow supplied to and discharged from the hydraulic cylinder J1 according to the amount of opening of a throttle valve and the rotational speed of an engine.

The control valve DV has a pump port Pp, three tank ports Pt, and a pair of output ports Pa, Pb. The output ports Pa, Pb are connected through the pipes 137, 138, respectively, to the input ports 135, 136 of the head and rod chambers 131, 132 of the hydraulic cylinder J1. The pump port Pp is coupled to the gear pump 139 through the pipes 140, and the tank ports Pt are coupled to tank 142 through the pipe 141. The relief pipe 143 is connected between the gear pump 139 and the pump port Pp for relieving oil under pressure from the gear pump 139 through the relief valve 144 into the oil tank 142 for thereby keeping the oil pressure in the pipes within a prescribed pressure range.

The gear pump 139 is operatively coupled to the engine, denoted at E, for delivering working oil under pressure from the oil tank 142. The gear pump 139 has a rotatable shaft connected at one end to a hydraulic governor 145.

The hydraulic governor 145 has an input port 145a coupled to the discharge pipe 140 of the gear pump 139 and an output port 145b coupled by a pipe 146 to a governor pressure input port Pg of the control valve DV. Therefore, the hydraulic governor 145 can apply a governor hydraulic pressure proportional to the rotational speed of the engine E to the control valve DV.

The control valve DV has a spool 147 reciprocally slidably disposed in the valve casing for controlling the direction of oil flows across the control valve DV. The spool 147 has one end 147a subjected to the pressure of the oil discharged from the gear pump 139 and introduced through a pump pressure input port Pi.

The discharge pipe 140 of the gear pump 139 and the pump pressure inlet port Pi are interconnected by a pipe 148 having a solenoid-operated directional control valve EV which comprises a two-position, three-way valve. The directional control valve EV is normally in a position in which the pump pressure input port Pi and the oil tank 142 communicate with each other. The directional control valve EV has a solenoid 149 which is energized by a signal from a control unit Cc (described later on) for shifting the valve into a position in which the discharge pipe 140 on the gear pump 139 communicates with the pump pressure input port Pi.

The spool 147 has three axially spaced lands 181 held in close, slidable contact with an inner cylindrical surface 180 defined in the valve casing of the control valve DV, and smaller-diameter portions 182 disposed axially between the lands 181 for allowing working oil to flow around the smaller-diameter portions 182. The spool 147 can change the rates and directions of flows of working oil across the control valve DV by varying the relative position between the lands 181, the smaller-diameter portions 182, and the ports Pa, Pb, Pp, Pt. Coil springs 183, 184 of different spring constants, set under compression, act on the opposite ends, respectively, of the spool 147.

The end 147a of the spool 147 is of a diameter smaller than that of the lands 181, and extends axially and is closely slidably fitted in a guide hole 185 defined in the control valve casing. The guide hole 185 and the spool end 147a define a pump oil chamber 186 communicating with the pump pressure input port Pi. The land 181 closest to the spool end 147a has an end face 181a on which the coil spring 183, acts, the end face 181a and the inner cylindrical surface 180 jointly defining a governor oil chamber 187 communicating with the governor input port Pg. The hydraulic pressures applied through the input ports Pi, Pg and the resilient force from the coil spring 183 jointly impose a force Fr tending to move the spool 147 to the right.

The coil spring 184 acting on the other end of the spool 147 can be compressed by a cam lever 188 operatively coupled to an accelerator pedal 189 associated with the engine E. As the throttle valve is opened by depressing the accelerator pedal 189, the cam lever 188 pushes the coil spring 184 to increase a force F1 tending to move the spool 147 to the left.

When the spool 147 is moved to the left in FIG. 10, the pump port Pp and the output port Pb communicating with the rod chamber 132 of the hydraulic cylinder J1 are brought into communication with each other, and the output port Pa communicating with the head chamber 131 and the tank port Pt are brought into communication with each other. Now, the piston rod 129 of the hydraulic cylinder J1 is moved to the left to increase the angle of inclination of the motor swash plate 38. Conversely, when the spool 147 is moved to the right, the pump port Pp and the output port Pa communicating with the head chamber 131 are brought into communication with each other, and the output port Pb communicating with the rod chamber 132 and the tank port Pt are brought into communication with each other, whereupon the piston rod 129 is moved to the right to reduce the angle of inclination of the motor swash plate 38. The force F1 tending to move the spool 147 to the left increases in proportion to the throttle opening, and the force Fr tending to move the spool 147 to the right increases in proportion to the engine rotational speed, as described above. Therefore, when the forces F1, Fr are equal to each other, the spool 147 is in its neutral position and no working oil flows across the control valve DV, fixing the angle of the motor swash plate 38. When Fr >F1, the spool 147 is moved to the right to reduce the angle of inclination of the motor swash plate 38 and hence the transmission ratio. When Fr <F1, the spool 147 is moved to the left to increase the angle of inclination of the motor swash plate 38 and hence the transmission ratio. The above operation is summarized in Table 3 as follows:

TABLE 3

| Fr-F1 relation | Spool position | Piston rod (129) | Motor swash plate angle | Transmission ratio |
| --- | --- | --- | --- | --- |
| Fr = F1 | Neutral | Stopped | Fixed | Fixed |
| Fr < F1 | Leftward | Leftward | Larger | Larger |
| Fr > F1 | Rightward | Rightward | Smaller | Smaller |

As shown in FIG. 4, the control unit Cc for controlling the solenoid-operated directional control valve EV comprises an NPN transistor 190 connected in series to the solenoid 149, a comparator 193 connected to the base of the transistor 190 via series-connected resistors 191, 192, a frequency-to-voltage converter 194 connected to a noninverting input terminal (+) of the comparator 193, a reference level setting circuit 195 coupled to an inverting input terminal (−) of the comparator 193, and a relay unit 106 for selectively draining an output signal from the comparator 193 to ground.

Figure 12:
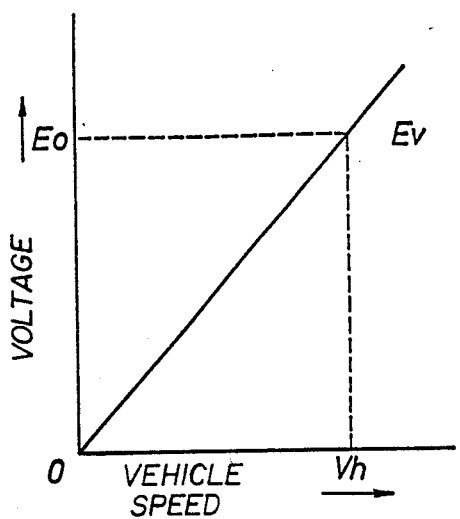
FIG. 12 is a graph showing the relationship between a vehicle speed and a voltage.

The frequency-to-voltage converter 194 is coupled to a vehicle speed sensor 198 through a waveform shaper 197. An electric signal representative of a vehicle speed, issued from the vehicle speed sensor 198, is processed by the waveform shaper 197, and then converted by the frequency-to-voltage converter 194 to a voltage signal Ev proportional to the vehicle speed, as shown in FIG. 12.

The reference level setting circuit 195 includes a first voltage-divider resistor 200 coupled to a reference voltage terminal 199 and a second voltage-divider resistor 201 connected in series to the first voltage-divider resistor 200 and to ground. The relay unit 196 is responsive to energization of a coil 202 thereof for opening a movable contact 203. The coil 202 is connected to a positive power supply terminal 206 through an angle sensor 205 having a movable contact 204 which is operatively coupled to the hydraulic cylinder J1. The movable contact 204 is closed when the angle of inclination of the motor swash plate 38 is substantially minimal.

The reference voltage of the comparator 193 is a voltage Eo which is produced by dividing the voltage applied to the reference power supply terminal 199 by the voltage-divider resistors 200, 201. The reference voltage Eo corresponds to a relatively high vehicle speed Vh (see FIG. 12). Therefore, when the voltage Ev commensurate with the vehicle speed, applied to the noninverting input terminal (+) of the comparator 193, is equal to or higher than the reference voltage Eo, i.e., when the vehicle speed reaches or exceeds a prescribed vehicle speed, the transistor 190 is rendered conductive to energize the solenoid 149. Insofar as the angle of the motor swash plate 38 is not substantially minimal, however, the contact 204 of the angle sensor 205 remains open and the contact 203 of the relay unit 196 remains closed. Consequently, any current issued from the comparator 193 is drained to ground through the relay unit 196, and the solenoid 149 is not energized.

The solenoid 149 of the solenoid-operated directional control valve EV is energized only when the angle of the motor swash plate 38 is substantially minimal and the vehicle speed reaches or exceeds the prescribed vehicle speed.

The cam mechanism C1 shown in FIG. 10 is essentially the same as that shown in FIG. 3 except that the driven cam 127 is fixed to the driven shaft 125.

The control system shown in FIG. 10 for controlling the hydraulically operated continuously variable transmission will operate as follows:

When the accelerator pedal 189 is depressed to start the vehicle, the throttle valve is opened and the coil spring 154 of the control valve DV is compressed by the cam lever 188 operatively coupled to the accelerator pedal 189. The force F1 tending move the spool 147 to the left is increased. Since the angle of the motor swash plate 38 is maximum and so is the transmission ratio at this time, the solenoid 149 of the directional control valve EV remains de-energized, and only the governor oil pressure commensurate with the engine rotational speed is applied to the governor pressure input port Pg. Since the engine rotational speed is not increased yet, the force Fr is smaller than the force F1, and the motor swash plate 38 is controlled in a direction to increase its angle of inclination. When the clutch valve 80 is opened now, oil discharged from the hydraulic pump P starts being supplied to the hydraulic motor M, thus getting the vehicle started.

As the engine rotational speed increases, the governor oil pressure also increases. When Fr >F1, the spool 147 of the control valve DV is moved to the right to move the piston rod 129 of the hydraulic cylinder J1 to the right. The motor swash plate 38 is now angularly displaced through the first link arm 72, the first pilot valve 64, and the ratio-changing servomotor S1 to reduce the transmission ratio for thereby increasing the vehicle speed.

As the transmission ratio decreases, the engine load is increased to suppress an increase in the engine rotational speed, with the result that Fr ≦F1. While the operation indicated in the Table 3 is being repeated within a short period of time, the transmission ratio is controlled such that the engine rotational speed will be kept substantially at a constant level according to the amount of opening of the throttle valve.

When the angle of the motor swash plate 38 is minimized and so is the t transmission ratio, the servomotor S2 is operated by the cam mechanism C1 to close the outlet port 54 of the hydraulic pump P.

If the vehicle speed is equal to or higher than the prescribed sped Vh (FIG. 12) at this time, then the solenoid 149 of the directional control valve EV is energized by the control unit Cc to introduce the oil discharged under pressure from the gear pump 139 into the pump oil chamber 186 in the control valve DV. Now, the force Fr is held higher than the force F1 irrespective of how the engine rotational speed may change, and the motor swash plate 38 is also locked in its position for the minimum transmission ratio. Therefore, the servomotor S2 is free from hunting.

If the vehicle speed is lower than the prescribed speed Vh, then the solenoid 149 of the directional control valve EV is de-energized, and hence no pump oil pressure is added to the force Fr tending to move the spool 147 to the right. Accordingly, the motor swash plate 38 is not locked. The servomotor S2 is also free from hunting at this time in as much as the rate of reduction in the engine rotational speed due to the closing of the hydraulic circuit is low.

The solenoid-operated directional control valve EV may suffer from hunting due to contact chatter. However, such hunting can be avoided by adding a hysteresis circuit to the control unit Cc.

As described above, when the vehicle speed is lower than the prescribed vehicle speed, the motor swash plate 38 is controlled as a function of the amount of opening of the throttle valve and the engine rotational speed. When the vehicle speed is equal to or higher than the prescribed vehicle speed, the motor swash plate 38 is locked in its least inclined position regardless of how the engine rotational speed may vary. As a result, the servomotor S2 is prevented from hunting in response to the motor swash plate 38.

Figure 13:
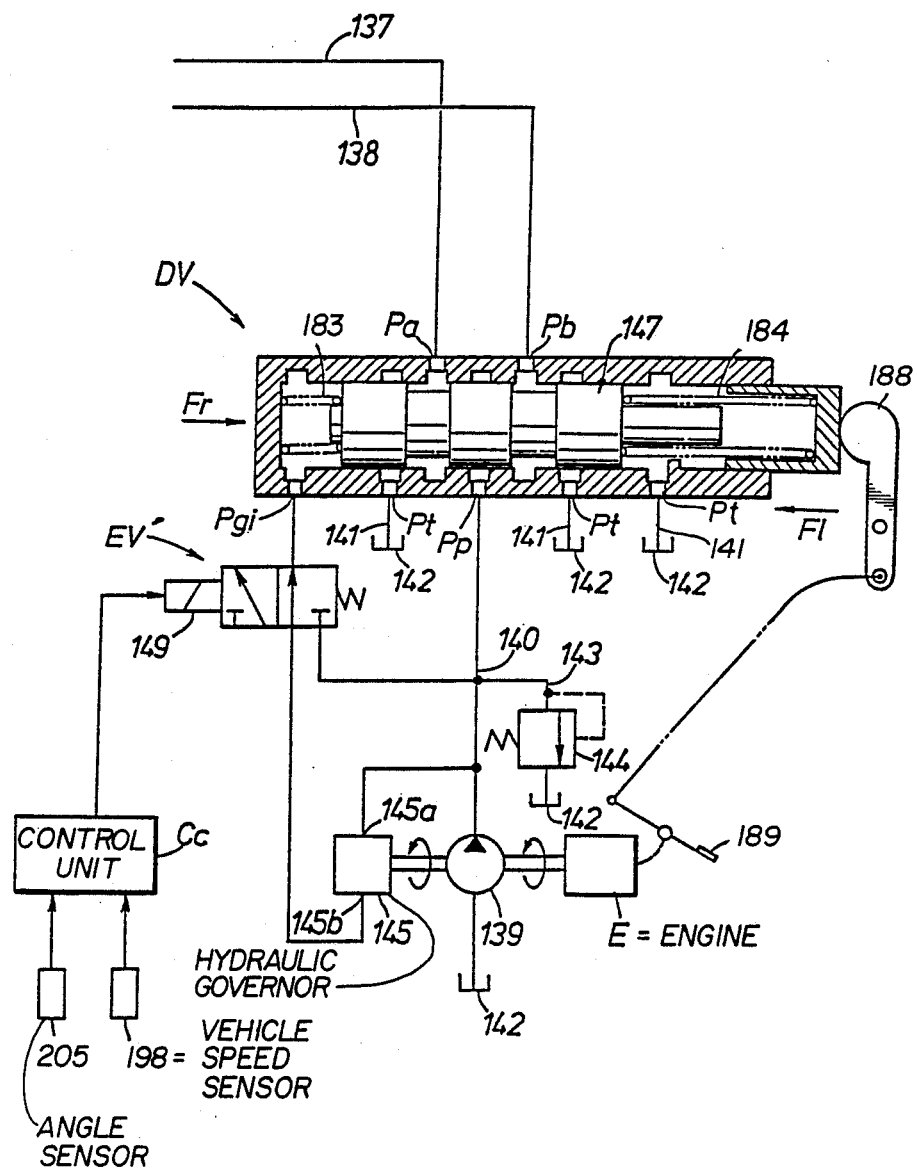
FIG. 13 is a hydraulic circuit diagram of a hydraulic control arrangement according to a further embodiment of the present invention.

FIG. 13 illustrates a hydraulic control arrangement according to a further embodiment of the present invention. In this embodiment, the governor oil pressure and the pump oil pressure are selectively applied through a solenoid-operated directional control valve EV' to an input port Pgi from which the oil pressure is imposed on the lefthand end of the spool 147. When certain operating conditions as described above are not met, only the governor oil pressure is applied to the spool 147. When the operating conditions are met, the directional control valve EV' is actuated by a signal from the control unit Cc to apply only the pump oil pressure to the spool 147. The forces Fr, F1 are selected such that when the governor oil pressure is applied, $Fr \leq F1$, and when the pump oil pressure is applied, $Fr > F1$.

FIG. 14 illustrates a hydraulic control arrangement according to a still further embodiment of the present invention. According to this embodiment, the force F1 tending to move the spool 147 to the left is obtained by throttle oil pressure commensurate with the throttle valve opening and applied to the righthand end of the spool 147 through a throttle oil pressure input port Ps. The throttle oil pressure is applied from a pressure regulator valve 207 operatively connected to the accelerator pedal 189 and supplied with the pump oil pressure. The pressure regulator valve 207 is connected to the input port Ps through a pipe 208 which is selectively openable and closable by the solenoid-operated directional control valve EV. The governor oil pressure is applied to the lefthand end of the spool 147 to apply the force Fr tending to move the spool 147 to the right.

When prescribed operating conditions are not met, the governor oil pressure and the throttle oil pressure are applied respectively to the opposite ends of the spool 147 such that $Fr \leq F1$. When the prescribed operating conditions are met, the throttle oil pressure is cut off by the directional control valve EV, so that $Fr > F1$.

In the embodiments shown in FIGS. 10 through 14, the spool 147 of the control valve DV is controlled under the coil spring forces and hydraulic pressures applied thereto for controlling the motor swash plate 38. However, spool 147 may be controlled by map control using a CPU, for example.

The cam mechanisms C1, C2 for operatively connecting the servomotors S1, S2 are not limited to the illustrated arrangements, but may be modified in various ways. Alternatively, the motor swash plate may be operated by an actuator, and the hydraulic circuit may be selectively made and broken by another actuator.

The detection of the throttle valve opening or the accelerator pedal depression as an indication of the driver's intention of acceleration and deceleration may be replaced with the detection of the vacuum developed in the intake pipe of the engine, and the amount of fuel supplied.

In the foregoing embodiments, the transmission ratio is controlled on the basis of the engine rotational speed. However, the transmission ratio may be controlled on the basis of the engine torque.

Although certain preferred embodiments have been shown and described, it should be understood that many changes and modifications may be made therein without departing from the scope of the appended claims.

What is claim is:

1. A hydraulically operated continuously variable transmission comprising:
   an input shaft;
   a hydraulic pump coupled to said input shaft and having inlet and outlet ports;
   an output shaft;
   a variable-displacement hydraulic motor coupled to said output shaft;
   a closed hydraulic circuit interconnecting said hydraulic pump and said hydraulic motor and including a passage connecting said inlet and outlet ports of the hydraulic pump;
   a servomotor for making and breaking said hydraulic circuit respectively by opening and closing said outlet port;
   a clutch valve for continuously varying the cross-sectional area of said passage to change the amount of power transmitted between said hydraulic pump and said hydraulic motor; and
   a control system for independently controlling said servomotor and said clutch valve, said control system being arranged to hold said servomotor in a position to open said outlet port when said clutch valve is opened beyond a prescribed degree.

2. A hydraulically operated continuously variable transmission comprising:
   an input shaft;
   a hydraulic pump coupled to said input shaft and having inlet and outlet ports;
   an output shaft;
   a variable-displacement hydraulic motor coupled to said output shaft;
   a closed hydraulic circuit interconnecting said hydraulic pump and said hydraulic motor and including a passage connecting said inlet and outlet ports of the hydraulic pump;
   a servomotor for making and breaking said hydraulic circuit respectively by opening and closing said outlet port;
   a clutch valve for continuously varying the cross-sectional area of said passage to change the amount of power transmitted between said hydraulic pump and said hydraulic motor; and
   a control system for independently controlling said servomotor and said clutch valve, said control system being arranged to hold said servomotor in a position to open said outlet port when said clutch valve is opened beyond a prescribed degree;
   said clutch valve comprising a hollow fixed shaft having a first passageway, and a cylindrical member rotatably fitted centrally in said hollow fixed shaft and having a second passageway, said cylindrical member being rotatable about its own axis to bring said first and second passages into and out of mutual registry, said servomotor being axially slidable fitted in said cylindrical member.

3. A hydraulically operated continuously variable transmission comprising:
an input shaft;
a hydraulic pump coupled to said input shaft and having inlet and outlet ports;
an output shaft;
a variable-displacement hydraulic motor coupled to said output shaft;
a closed hydraulic circuit interconnecting said hydraulic pump and said hydraulic motor and including a passage connecting said inlet and outlet ports of the hydraulic pump;
a servomotor for making and breaking said hydraulic circuit respectively by opening and closing said outlet port;
a clutch valve for continuously varying the cross-sectional area of said passage to change the amount of power transmitted between said hydraulic pump and said hydraulic motor; and
a control system for independently controlling said servomotor and said clutch valve, said control system being arranged to hold said servomotor in a position to open said outlet port when said clutch valve is opened beyond a prescribed degree;
said clutch valve comprising a hollow fixed shaft having a first passageway, and a cylindrical member rotatably fitted centrally in said hollow fixed shaft and having a second passageway, said cylindrical member being rotatable about its own axis to bring said first and second passages into and out of mutual registry, said servomotor being axially slidable fitted in said cylindrical member;
wherein said first passageway includes a pair of diametrically opposite ports defined in said first shaft and said second passageway includes a pair of diametrically opposite holes, said ports and said holes defining said passage when they are held in registry with each other.

4. A hydraulically operated continuously variable transmission comprising:
an input shaft;
a hydraulic pump coupled to said input shaft and having inlet and outlet ports;
an output shaft;
a variable-displacement hydraulic motor coupled to said output shaft;
a closed hydraulic circuit interconnecting said hydraulic pump and said hydraulic motor and including a passage connecting said inlet and outlet ports of the hydraulic pump;
a servomotor for making and breaking said hydraulic circuit respectively by opening and closing said outlet port;
a clutch valve for continuously varying the cross-sectional area of said passage to change the amount of power transmitted between said hydraulic pump and said hydraulic motor; and
a control system for independently controlling said servomotor and said clutch valve, said control system being arranged to hold said servomotor in a position to open said outlet port when said clutch valve is opened beyond a prescribed degree;
said clutch valve comprising a hollow fixed shaft having a first passageway, and a cylindrical member rotatably fitted centrally in said hollow fixed shaft and having a second passageway, said cylindrical member being rotatable about its own axis to bring said first and second passages into and out of mutual registry, said servomotor being axially slidable fitted in said cylindrical member;
wherein said servomotor includes a shoe for selectively opening and closing one end of said outlet port.

5. A hydraulically operated continuously variable transmission comprising:
an input shaft;
a hydraulic pump having a pump cylinder coupled to said input shaft and a plurality of pump plungers disposed in said pump cylinder in an annular pattern around an axis of rotation of the pump cylinder, said hydraulic pump having an inlet port and an outlet port;
an output shaft;
a hydraulic motor having a motor cylinder coupled to said output shaft and a plurality of motor plungers disposed in said motor cylinder in an annular pattern around an axis of rotation of said motor cylinder, said hydraulic motor having an inlet port;
a closed hydraulic circuit interconnecting said hydraulic pump and said hydraulic motor and including a passage connecting said inlet and outlet ports of the hydraulic pump;
a clutch valve for continuously varying the cross-sectional area of said passage, said clutch valve comprising a hollow fixed shaft having a first passageway, and a cylindrical member rotatably fitted centrally in said hollow fixed shaft and having a second passageway, said cylindrical member being rotatable about its own axis to bring said first and second passages into and out of mutual registry;
a pump swash plate for reciprocally moving said pump plungers;
a tiltable motor swash plate for rotating said motor cylinder in response to reciprocating movement of said pump plungers, said tiltable motor swash plate being tiltable through a continuously variable angle for continuously adjusting the stroke of reciprocating movement of said motor plungers;
a first hydraulic servomotor operable by a first pilot valve for varying the angle of inclination of said motor swash plate;
a second hydraulic servomotor operable by a second pilot valve for selectively connecting and disconnecting said pump outlet port and said motor inlet port; and
a cam mechanism operatively coupling said first and second pilot valves.

6. A hydraulically operated continuously variable transmission comprising:
an input shaft;
a hydraulic pump having a pump cylinder coupled to said input shaft and a plurality of pump plungers disposed in said pump cylinder in an annular pattern around an axis of rotation of the pump cylinder, said hydraulic pump having an outlet port;
an output shaft;
a hydraulic motor having a motor cylinder coupled to said output shaft and a plurality of motor plungers disposed in said motor cylinder in an annular pattern around an axis of rotation of said motor cylinder, said hydraulic motor having an inlet port;

a closed hydraulic circuit interconnecting said hydraulic pump and said hydraulic motor;

a pump swash plate for reciprocally moving said pump plungers;

a tiltable motor swash plate for rotating said motor cylinder in response to reciprocating movement of said pump plungers, said tiltable motor swash plate being tiltable through a continuously variable angle for continuously adjusting the stroke of reciprocating movement of said motor plungers;

a first hydraulic servomotor operable by a first pilot valve for varying the angle of inclination of said motor swash plate;

a second hydraulic servomotor operable by a second pilot valve for selectively connecting and disconnecting said outlet and inlet ports; and a cam mechanism operatively coupling said first and second pilot valves;

said cam mechanism comprising a driver shaft, a first arm coupled to said first pilot valve and annularly movably supported on said driver shaft, a driver cam mounted on said driver shaft for rotation therewith, a driven shaft, a driven cam mounted on said driven shaft and angularly movable in engagement with said driver cam, and a second arm mounted on said driven shaft and coupled to said second pilot valve for converting angular movement of said driven cam to linear movement and for transmitting the linear movement to said second pilot valve.

7. A hydraulically operated continuously variable transmission according to claim 6, wherein said driver cam comprises an arcuate portion extending around said driver shaft, a lobe projecting radially outwardly beyond a circumferential surface of said arcuate portion, and a recess disposed radially inwardly within the circumferential surface of said arcuate portion, said driven cam comprising a concave surface having a curvature complementary to that of said arcuate portion, and a straight portion extending tangentially to said concave surface and engageable with said lobe.

8. A hydraulically operated continuously variable transmission according to claim 6, including spring means on said driven shaft for normally urging said driven cam in one direction around said driven shaft.

9. A hydraulically operated continuously variable transmission according to claim 6, wherein said driver cam comprises a plate having a groove and said driven cam comprises a pin riding in said groove.

10. A hydraulically operated continuously variable transmission comprising:

an input shaft;

a hydraulic pump having a pump cylinder coupled to said input shaft and a plurality of pump plungers disposed in said pump cylinder in an annular pattern around an axis of rotation of the pump cylinder, said hydraulic pump having an outlet port;

an output shaft;

a hydraulic motor having a motor cylinder coupled to said output shaft and a plurality of motor plungers disposed in aid motor cylinder in an annular pattern around an axis of rotation of said motor cylinder, said hydraulic motor having an inlet port;

a closed hydraulic circuit interconnecting said hydraulic pump and said hydraulic motor;

a pump swash plate for reciprocally moving said pump plungers;

a tiltable motor swash plate for rotating said motor cylinder in response to reciprocating movement of said pump plungers, said tiltable motor swash plate being tiltable through a continuously variable angle for continuously adjusting the stroke of reciprocating movement of said motor plungers;

detector means for detecting an operating condition of an engine which drives said input shaft;

means for disconnecting said outlet and input ports when the angle of said motor swash plate is substantially minimal; and control means responsive to a signal from said detector means for tilting said motor swash plate to operate said engine in a prescribed condition, said control means being arranged such that when a vehicle incorporating the hydraulically operated continuously variable transmission runs at a prescribed speed or a higher speed and the angle of said motor swash plate is substantially minimal said outlet and inlet ports remaining disconnected from each other by said disconnecting means.

11. A hydraulically operated continuously variable transmission comprising:

an input shaft;

a hydraulic pump having a pump cylinder coupled to said input shaft and a plurality of pump plungers disposed in said pump cylinder in an annular pattern around an axis of rotation of the pump cylinder, said hydraulic pump having an outlet port and an inlet port;

an output shaft;

a hydraulic motor having a motor cylinder coupled to said output shaft and a plurality of motor plungers disposed in said motor cylinder in an annular pattern around an axis of rotation of said motor cylinder, said hydraulic motor having an inlet port;

a closed hydraulic circuit interconnecting said hydraulic pump and said hydraulic motor and including a passage connecting said inlet and outlet ports of said hydraulic pump;

a pump swash plate for reciprocally moving said pump plungers;

a tiltable motor swash plate for rotating said motor cylinder in response to reciprocating movement of said pump plungers, said tiltable motor swash plate being tiltable through a continuously variable angle for continuously adjusting the stroke of reciprocating movement of said motor plungers;

a first hydraulic servomotor operable by a first pilot valve for varying the angle of inclination of said motor swash plate;

a second hydraulic servomotor operable by a second pilot valve for selectively connecting and disconnecting said pump outlet port and said motor inlet port;

a cam mechanism operatively coupling said first and second pilot valves;

a clutch valve for continuously varying the cross-sectional area of said passage to change the amount of power transmitted between said hydraulic pump and said hydraulic motor; and a control system for controlling said second hydraulic servomotor and said clutch valve independently when said clutch valve is not opened beyond a prescribed degree and for further holding said second servomotor in a position to connect said pump outlet port and said motor inlet port when said clutch valve is opened beyond a prescribed degree.

12. A hydraulically operated continuously variable transmission comprising:
an input shaft;
a hydraulic pump having a pump cylinder coupled to said input shaft and a plurality of pump plungers disposed in said pump cylinder in an annular pattern around an axis of rotation of the pump cylinder, said hydraulic pump having an outlet port and an inlet port;
an output shaft;
a hydraulic motor having a motor cylinder coupled to said output shaft and a plurality of motor plungers disposed in said motor cylinder in an annular pattern around an axis of rotation of said motor cylinder, said hydraulic motor having an inlet port;
a closed hydraulic circuit interconnecting said hydraulic pump and said hydraulic motor and including a passage connecting said inlet and outlet ports of said hydraulic pump;
a pump swash plate for reciprocally moving said pump plungers;
a tiltable motor swash plate for rotating said motor cylinder in response to reciprocating movement of said pump plungers, said tiltable motor swash plate being tiltable through a continuously variable angle for continuously adjusting the stroke of reciprocating movement of said motor plungers;
a first hydraulic servomotor operable by a first pilot valve for varying the angle of inclination of said motor swash plate;
a second hydraulic servomotor operable by a second pilot valve for selectively connecting and disconnecting said pump outlet port and said motor inlet port;
a cam mechanism operatively coupling said first and second pilot valves;
a clutch valve for continuously varying the cross-sectional area of said passage to change the amount of power transmitted between said hydraulic pump and said hydraulic motor;
a hydraulic cylinder operatively connected to said clutch valve for operating said clutch valve; and
a servo valve operatively connected to said hydraulic cylinder for controlling the rate of oil flow to be supplied to and discharged from said hydraulic cylinder.

13. A hydraulically operated continuously variable transmission comprising:
an input shaft;
a hydraulic pump coupled to said input shaft and having inlet and outlet ports;
an output shaft;
a variable-displacement hydraulic motor coupled to said output shaft;
a closed hydraulic circuit interconnecting said hydraulic pump and said hydraulic motor and including a passage connecting said inlet and outlet ports of the hydraulic pump;
a servomotor for making and breaking said hydraulic circuit respectively by opening and closing said outlet port;
a clutch valve for continuously varying the cross-sectional area of said passage to change the amount of power transmitted between said hydraulic pump and said hydraulic motor; and
a control system for controlling said servomotor and said clutch valve, said control system controlling said servomotor and said clutch valve independently when said clutch valve is not opened beyond a prescribed degree, said control system holding said servomotor in a position to open said outlet port when said clutch valve is opened beyond a prescribed degree.

14. A hydraulically operated continuously variable transmission comprising:
an input shaft;
a hydraulic pump coupled to said input shaft and having inlet and outlet ports;
an output shaft;
a variable-displacement hydraulic motor coupled to said output shaft;
a closed hydraulic circuit interconnecting said hydraulic pump and said hydraulic motor and including a passage connecting said inlet and outlet ports of the hydraulic pump;
a servomotor for making and breaking said hydraulic circuit respectively by opening and closing said outlet port;
a clutch valve for continuously varying the cross-sectional area of said passage to change the amount of power transmitted between said hydraulic pump and said hydraulic motor;
a control system for independently controlling said servomotor and said clutch valve; and
means to override said control system and hold said servomotor in a position to hold said outlet port open when said clutch valve is opened beyond a prescribed degree.

15. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and means for making and breaking said hydraulic circuit respectively by opening and closing said outlet port, comprising:
means for independently controlling said clutch valve and said means for making and breaking when said clutch valve is not opened beyond a prescribed degree; and
means for holding said outlet port open when said clutch valve is opened beyond a prescribed degree.

16. The control system of claim 15, wherein said means for making and breaking comprises a servomotor.

17. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:
control means for independently controlling said clutch valve and said servomotor when said clutch valve is not opened beyond a predetermined amount and for holding said servomotor in a position to hold said outlet port open when said clutch valve is opened beyond said predetermined amount.

18. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:

control means for independently controlling said clutch valve and said servomotor when said clutch valve is not opened beyond a predetermined amount and for holding servomotor in a position to hold said outlet port open when said clutch valve is opened beyond said predetermined amount, said control means comprising, a first cam operatively connected to said swashplate in such a manner that the position of said cam indicates an angle of inclination of said swashplate;

a second cam operatively connected to said servomotor, said second cam being capable of interacting with said first cam to control the position of said servomotor in response to the angle of inclination of said swashplate;

clutch operating means for varying the amount of opening of said clutch;

second cam lock-up means for alternately locking-up said second cam to cause said second cam to respond to said first cam when said clutch is not opened beyond said predetermined amount and unlocking said second cam to cause said second cam to not respond to said first cam when said clutch is opened beyond said predetermined amount; and servomotor biasing means to cause said servomotor to open said outlet port when said second cam lock-up means has said second cam unlocked.

19. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:

control means for independently controlling said clutch valve and said servomotor when said clutch valve is not opened beyond a predetermined amount and for holding said servomotor in a position to hold said outlet port open when said clutch valve is opened beyond said predetermined amount, said control means comprising, a first cam operatively connected to said swashplate in such a manner that the position of said cam indicates an angle of inclination of said swashplate;

a second cam operatively connected to said servomotor, said second cam being capable of interacting with said first cam to control the position of said servomotor in response to the angle of inclination of said swashplate;

clutch operating means for varying the amount of opening of said clutch;

second cam lock-up means for alternately locking-up said second cam to cause said second cam to respond to said first cam when said clutch is not opened beyond said predetermined amount and unlocking said second cam to cause said second cam to not respond to said first cam when said clutch is opened beyond said predetermined amount; and servomotor biasing means to cause said servomotor to open said outlet port when said second cam lock-up means has said second cam unlocked, wherein said servomotor biasing means comprises a spring.

20. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:

control means for independently controlling said clutch valve and said servomotor when said clutch valve is not opened beyond a predetermined amount and for holding said servomotor in a position to hold said outlet port open when said clutch valve is opened beyond said predetermined amount, said control means comprising, a first cam operatively connected to said swashplate in such a manner that the position of said cam indicates an angle of inclination of said swashplate;

a second cam operatively connected to said servomotor, said second cam being capable of interacting with said first cam to control the position of said servomotor in response to the angle of inclination of said swashplate;

clutch operating means for varying the amount of opening of said clutch;

second cam lock-up means for alternately locking-up said second cam to cause said second cam to respond to said first cam when said clutch is not opened beyond said predetermined amount and unlocking said second cam to cause said second cam to not respond to said first cam when said clutch is opened beyond said predetermined amount; and servomotor biasing means to cause said servomotor to open said outlet port when said second cam lock-up means has said second cam unlocked, wherein said clutch operating means comprises a servo valve operatively connected to said clutch valve.

21. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:

control means for independently controlling said clutch valve and said servomotor when said clutch valve is not opened beyond a predetermined amount and for holding said servomotor in a position to hold said outlet port open when said clutch valve is opened beyond said predetermined amount, said control means comprising.

a first cam operatively connected to said swashplate in such a manner that the position of said cam indicates an angle of inclination of said swashplate;

a second cam operatively connected to said servomotor, said second cam being capable of interacting with said first cam to control the position of said servomotor in response to the angle of inclination of said swashplate;

clutch operating means for varying the amount of opening of said clutch;

second cam lock-up means for alternately locking-up said second cam to cause said second cam to respond to said first cam when said clutch is not opened beyond said predetermined amount and unlocking said second cam to cause said second cam to not respond to said first cam when said clutch is opened beyond said predetermined amount; and servomotor biasing means to cause said servomotor to open said outlet port when said second cam lock-up means has said second cam unlocked, wherein said first cam comprises a driver cam and said second cam comprises a follower cam.

22. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:

control means for independently controlling said clutch valve and said servomotor when said clutch valve is not opened beyond a predetermined amount and for holding said servomotor in a position to hold said outlet port open when said clutch valve is opened beyond said predetermined amount, said control means comprising, a first cam operatively connected to said swashplate in such a manner that the position of said cam indicates an angle of inclination of said swashplate;

a second cam operatively connected to said servomotor, said second cam being capable of interacting with said first cam to control the position of said servomotor in response to the angle of inclination of said swashplate;

clutch operating means for varying the amount of opening of said clutch;

second cam lock-up means for alternately locking-up said second cam to cause said second cam to respond to said first cam when said clutch is not opened beyond said predetermined amount and unlocking said second cam to cause said second cam to not respond to said first cam when said clutch is opened beyond said predetermined amount; and servomotor biasing means to cause said servomotor to open said outlet port when said second cam lock-up means has said second cam unlocked, wherein said first cam comprises a driver cam and said second cam comprises a follower cam and, wherein said second cam lock-up means comprises an arm capable of engagement and disengagement with a engaging member on said follower cam, and a shifter for selectively moving said arm, said shifter being operatively connected to said clutch operating means and moving in accordance with the amount of opening of said clutch valve in such a manner that said shifter moves said arm out of engagement with said engaging member when said clutch valve is opened beyond said predetermined amount and said shifter allows said arm to engage said engaging member when said clutch valve is not opened beyond said predetermined amount.

23. A control system in a swashplate type hydrostatic continuously variable transmission having a hydraulic motor and a hydraulic pump connected together through a closed hydraulic circuit, a clutch valve for continuously varying the cross-sectional area of a passage connecting inlet and outlet ports of the hydraulic pump, and a servomotor for making and breaking said hydraulic circuit respectively by opening and closing said outlet port, comprising:

control means for independently controlling said clutch valve and said servomotor when said clutch valve is not opened beyond a predetermined amount and for holding said servomotor in a position to hold said outlet port open when said clutch valve is opened beyond said predetermined amount, wherein said control means comprises, a first cam operatively connected to said swashplate in such a manner that the position of said cam indicates an angle of inclination of said swashplate;

a second cam operatively connected to said servomotor, said second cam being capable of interacting with said first cam in such a manner that when said first cam indicates that said swashplate is at a predetermined swashplate angle, said second cam is moved in such a manner as to operate said servomotor to close said outlet port;

clutch operating means for varying the amount of opening of said clutch;

second cam lock-up means for alternately locking-up said second cam to cause said second cam to respond to said first cam when said clutch is not opened beyond said predetermined amount and unlocking said second cam to cause said second cam to not respond to said first cam when said clutch is opened beyond said predetermined amount; and servomotor biasing means to cause said servomotor to open said outlet port when said second cam lock-up means has said second cam unlock.

* * * * *

UNITED STATES PATENT AND TRADEMARK OFFICE
CERTIFICATE OF CORRECTION

PATENT NO. : 4,901,529

DATED : February 20, 1990

INVENTOR(S) : Takashi Iino et al.

It is certified that error appears in the above-identified patent and that said Letters Patent is hereby corrected as shown below:

Column 31, line 9 after "holding" insert --said--.

Column 34, line 54 change "unlock" to --unlocked--.

Signed and Sealed this

Nineteenth Day of May, 1992

Attest:

DOUGLAS B. COMER

*Attesting Officer*     Acting Commissioner of Patents and Trademarks